(12) United States Patent
Brady

(10) Patent No.: US 12,490,046 B2
(45) Date of Patent: Dec. 2, 2025

(54) SYSTEM AND METHODS FOR AUTOMATICALLY CHECKING-IN A VEHICLE

(71) Applicant: Tracematics Limited, Dublin (IE)

(72) Inventor: Thomas Brady, County Dublin (IE)

(73) Assignee: Tracematics Limited, Dublin (IE)

( * ) Notice: Subject to any disclaimer, the term of this patent is extended or adjusted under 35 U.S.C. 154(b) by 731 days.

(21) Appl. No.: 17/688,953

(22) Filed: Mar. 8, 2022

(65) Prior Publication Data
US 2022/0248171 A1    Aug. 4, 2022

Related U.S. Application Data

(63) Continuation of application No. 16/480,584, filed as application No. PCT/EP2018/052079 on Jan. 29, 2018, now Pat. No. 11,304,025.

(30) Foreign Application Priority Data

Jan. 27, 2017    (GB) ..................................... 1701390

(51) Int. Cl.
*G06Q 10/00* (2023.01)
*G06Q 10/0631* (2023.01)
(Continued)

(52) U.S. Cl.
CPC ...... *H04W 4/021* (2013.01); *G06Q 10/06314* (2013.01); *G06Q 30/0645* (2013.01);
(Continued)

(58) Field of Classification Search
None
See application file for complete search history.

(56) References Cited

U.S. PATENT DOCUMENTS 8,626,540 B2    1/2014    Peterkofsky et al.
10,593,208 B1    3/2020    O'Sullivan
(Continued)

OTHER PUBLICATIONS

Lubinsky, Daryl, GPS Tracking the Right Way: Disclosure, Fees and Recovery, Sep. 1, 2011, Auto Rental News. https://www.autorentalnews.com/147811/gps-tracking-the-right-way-disclosure-fees-and-recovery, p. 1-16. (Year: 2011).*

(Continued)

*Primary Examiner* — Joseph M Waesco
(74) *Attorney, Agent, or Firm* — The Marbury Law Group, PLLC

(57) ABSTRACT

Methods and systems for automatically checking-in a vehicle upon its return to a station or depot. A computing device may receive fleet management data that includes a return location for the vehicle from a fleet management system. The computing device may also receive geolocation data collected by an on-board unit of the vehicle, and use the received fleet management data and the received geolocation data to determine whether the vehicle is at its return location. The computing device may then close a contract associated with the vehicle in response to determining that the vehicle is at the return location. Closing the contract may include incrementing a total rental fee value based on a total rental mileage, a return time that the vehicle entered the return location, whether the total rental mileage is within an expected rental mileage, whether the return time is before an expected return time, etc.

18 Claims, 16 Drawing Sheets

1601

(51) Int. Cl.
  *G06Q 30/0645* (2023.01)
  *G06Q 50/40* (2024.01)
  *G08G 1/00* (2006.01)
  *H04W 4/021* (2018.01)
  *H04W 4/029* (2018.01)
  *H04W 4/40* (2018.01)

(52) U.S. Cl.
  CPC ............ *G06Q 50/40* (2024.01); *G08G 1/207* (2013.01); *H04W 4/029* (2018.02); *H04W 4/40* (2018.02)

(56) References Cited

U.S. PATENT DOCUMENTS

| | | | |
|---|---|---|---|
| 2003/0120522 A1 | 6/2003 | Uyeki | |
| 2007/0168217 A1 | 7/2007 | Weas et al. | |
| 2009/0172035 A1 | 7/2009 | Lessing et al. | |
| 2014/0052478 A1 | 2/2014 | Weinstock et al. | |
| 2014/0172727 A1* | 6/2014 | Abhyanker | G06Q 50/40 705/307 |
| 2014/0249751 A1* | 9/2014 | Ressayre | G08B 21/0269 701/517 |
| 2014/0278608 A1* | 9/2014 | Johnson | G06Q 50/40 705/5 |
| 2014/0279293 A1 | 9/2014 | Morgan et al. | |
| 2015/0199619 A1 | 7/2015 | Ichinose et al. | |
| 2015/0348178 A1* | 12/2015 | Taylor | G06Q 30/0645 705/307 |
| 2016/0210707 A1 | 7/2016 | Strnad, II | |
| 2016/0297398 A1* | 10/2016 | Jefferies | G07C 9/00571 |
| 2016/0364823 A1 | 12/2016 | Cao | |
| 2017/0091856 A1* | 3/2017 | Canberk | G06Q 30/0609 |
| 2017/0148060 A1 | 5/2017 | Showers | |
| 2017/0264578 A1 | 9/2017 | Allen et al. | |
| 2017/0323345 A1 | 11/2017 | Flowers et al. | |
| 2018/0189990 A1 | 7/2018 | Cardno | |
| 2019/0266894 A1 | 8/2019 | O'Sullivan | |
| 2021/0039642 A1* | 2/2021 | Nuesch | B60W 50/14 |
| 2025/0045816 A1* | 2/2025 | Chan | G06Q 10/02 |

OTHER PUBLICATIONS

Shaheen, Susan & Mallery, Mark & Kingsley, Karla, "Personal Vehicle Sharing Services in North America," Research in Transportation Business & Management, 3. 71-81, 10.1016/j.rtbm.2012.04.005, (2012).

European Patent Office, Examination Report in European Application No. 18702253.8, dated Jun. 24, 2021 (9 pages).

European Patent Office, International Search Report and Written Opinion for International Application No. PCT/EP2018/052079 dated Jul. 5, 2018 (11 pages).

* cited by examiner

SYSTEM AND METHODS FOR AUTOMATICALLY CHECKING-IN A VEHICLE

This application is a continuation of U.S. patent application Ser. No. 16/480,584, entitled "System and Methods for Maintaining a Vehicle Availability Report with respect to a Location" filed Jul. 24, 2019, which is a National Stage entry of PCT/EP2018/052079 filed on Jan. 29, 2018, which claims Foreign Priority to United Kingdom Application No. 1701390.5 filed Jan. 27, 2017, the entire contents of all of which are hereby incorporated by reference for all purposes.

FIELD

The present application relates to systems and methods for identifying and utilizing correlations between telematics data and data from a fleet management system. This correlation in combination with machine learning yields insights of interest and automated processes for reducing the operational expenditure of managing a fleet of vehicles.

BACKGROUND OF THE INVENTION

Telematics, in a broad sense, is any integrated use of telecommunications with information and communications technology. It is the technology of sending, receiving and storing information relating to remote objects, such as vehicles, via telecommunication devices.

Vehicle telematics can help improve the efficiency of an organization. Practical applications include fleet management. Fleet management is the management of a company's fleet of vehicles. Fleet management includes the management of motor vehicles such as cars, vans and trucks. Fleet (vehicle) Management can include a range of Fleet Management functions, such as vehicle financing, vehicle maintenance, vehicle telematics (tracking and diagnostics), driver management, fuel management, health and safety management and dynamic vehicle scheduling. Fleet Management is a function which allows companies which rely on transportation in their business to remove or minimize the risks associated with vehicle investment, improving efficiency, productivity and reducing their overall transportation costs, providing 100% compliance with government legislation and Duty of Care obligations. These functions can either be dealt with by an in-house Fleet Management department or an outsourced Fleet Management provider.

Employing telematics for a vehicle fleet usually involves the installation of an on-board unit in each automobile that communicates with the automobile controls, network and Telematics Service Provider (TSP) to provide Telematics features. This conventional architecture 100 is shown in FIG. 1. Vehicles 101 and 102 include respective on On-Board Units 104 and 105. The On-Board Units 104, 105 are installed in the vehicles 101, 102 to collect data from the vehicles and provide the data to the Telematics Service Provider 106. Any telecommunications network 107 (GSM, GPRS, Wi-Fi, WiMax, or L TE)) can be used to provide data the TSP 106.

As is known in the art, an OBU 104, 105 may include a global positioning system (GPS) unit, which keeps track of the latitude and longitude values of the vehicle; an external interface for mobile communication (GSM, GPRS, Wi-Fi, WiMax, or LTE), which provides the tracked values to a centralized geographical information system (GIS) database server; an electronic processing unit; a microcontroller, in some versions; a microprocessor or field programmable gate array (FPGA), which processes the information and acts on the interface between the GPS; a mobile communication unit; and some amount of memory for saving GPS values in case of mobile-free zones or to intelligently store information about the vehicle's sensor data.

Telematics is becoming particularly important to the rental vehicle industry. The Industry is changing due to the implementation of telematics at the core of rent-a-car companies. The trend started a few years ago in the U.S. and is now expanding to Europe and Latin America where the big players are deploying, or at least analyzing telematics as a driving force to increase efficiency and productivity. The benefits of telematics for the rent-a-car business can be split in to two main areas—benefits focused on efficiency and benefits focused on revenue generation.

The following is a list of some of the unnecessary costs incurred by the rental industry due to inefficiencies in fleet management:—
 High insurance costs for rental companies
  Unable to detect insurance fraud
  Unable to detect drivers with poor driving records
 Fleet check inefficiencies
  Manually performing a fleet check is error prone
  Costly in terms of time to perform fleet check and fix errors
 Check in/out errors
  Missed damage results in lost revenue.
  Wrong mileage leads to incorrect charges and poor customer experience
  Inaccurate Fuel Charges
 Vehicle Theft
  Unable to detect vehicle theft until it is too late to recover
 Increase utilization
  Cut downtime and turnaround time
  Reduce customer wait times In general, telematics opens a wide range of almost unlimited optimization opportunities for vehicle fleet management. In every vehicle fleet, regardless of size, there are many opportunities to control costs and reduce operational expenses. These opportunities can be identified using a combination of telematics data, rental data, business intelligence and big data analytics. Currently there are no solutions on the market that leverage telematics data, fleet management data and business intelligence to reduce the costs and improve the efficiency of managing a fleet of vehicles.

The present teachings addresses these deficiencies in the prior art.

SUMMARY

According to the present invention there is provided a method for maintaining a vehicle availability report with respect to a first location comprising determining the number of vehicles of a first type within a predetermined geofence at the first location, determining the number of vehicles of the first type due to leave the first location within a predetermined time period, determining whether the number of vehicles of the first type within the predetermined geofence is more than, equal to or less than the number of vehicles of the first type due to leave the first location within the predetermined time period and updating the vehicle availability report using a result of each determining step.

The method may further comprise compiling and storing geolocation data received from on-board units of respective vehicles of the first type within the predetermined geofence.

Optionally, wherein determining the number of vehicles of a first type within the predetermined geofence at the first location comprises accessing and analyzing the stored geolocation data.

The method may further comprise compiling and storing fleet management data received from a fleet management system for all vehicles associated with the first location.

Optionally, determining the number of vehicles of the first type due to leave the first location within a predetermined time period comprises accessing and analyzing 15 the stored fleet management data.

Optionally, the fleet management data lists all vehicles of each type that are scheduled to leave the first location within the predetermined time period.

Optionally, the fleet management data lists all vehicles of each type that were scheduled to leave the first location within a predetermined time window prior to the predetermined time period.

Optionally, determining the number of vehicles of the first type due to leave the first location within the predetermined time period comprising accessing the fleet management system and adding the number vehicles of the first type due to leave the first location within the predetermined time period to the number of vehicles of the first type that were scheduled to leave the first location within the predetermined time window prior to the predetermined time period.

The method may further comprise determining the number of vehicles of the first type scheduled to return to the first location within the predetermined time period.

The method may further comprise accessing geolocation data to determine the current position of the vehicles of the first type scheduled to return to the first location within the predetermined time period.

The method may further comprise creating a list of vehicles that will return to the first location by calculating, based on the current position of the vehicles of the first type scheduled to return to the first location, whether there is sufficient time for these vehicles to return to first station within the predetermined time period.

The method may further comprise adding the number of vehicles in the list of vehicles that will return to the first location to the number of vehicles of the first type within the predetermined geofence at the first location to obtain a total number of available vehicles of the first type.

The method may further comprise determining whether the total number of available vehicles of the first type is more than, equal to or less than the number of vehicles of the first type due to leave the first location within the predetermined time period.

Optionally, wherein the first location is defined by a first geofence and the predetermined geofence is within the first geofence. Optionally, the first geofence surrounds a vehicle rental outlet.

The method may further comprise determining the number of vehicles of the first type within a second predetermined geofence at the first location.

The method may further comprise calculating the time until the vehicles of the first type within the second predetermined geofence enter the first predetermined geofence based on a stored average time that it takes vehicles of the first type within the second predetermined geofence to enter the first predetermined geofence.

The method may further comprise creating a list of vehicles that will enter the first predetermined geofence within the predetermined time period and adding the number of vehicles in this list to the number of vehicles of a first type within the predetermined geofence to obtain a total number of vehicles of a first type within the predetermined geofence.

The method may further comprise determining whether the total number of vehicles is more than, equal to or less than the number of vehicles of the first type due to leave the first location within the predetermined time period.

Optionally, the second predetermined geofence surrounds at least one of a vehicle cleaning bay and vehicle return bay.

Optionally, the predetermined geofence surrounds a vehicle ready for rent bay.

The method may further comprise accessing the vehicle availability report to determine whether the number of vehicles of the first type within the predetermined geofence is less than the number of vehicles of the first type due to leave the first location within the predetermined time period and suggesting a course of action to a user to increase the number of vehicles of the first type within the predetermined geofence.

The method may further comprise determining the number of vehicles of a second type, different from the first type, within the predetermined geofence at the first location, determining the number of vehicles of the second type due to leave the first location within the predetermined time period, determining whether number of vehicles of the second type within the predetermined geofence at the first location is more than, equal to or less than the number of vehicles of the second type due to leave the first location within the predetermined time period, and updating the vehicle availability report with a result of each determining step.

The present teachings also relate to a computer readable medium having stored thereon a program, which when executed by a computer, performs a method for maintaining a vehicle availability report with respect to a first location comprising determining the number of vehicles of a first type within a predetermined geofence at the first location, determining the number of vehicles of the first type due to leave the first location within a predetermined time period, determining whether the number of vehicles of the first type within the predetermined geofence is more than, equal to or less than the number of vehicles of the first type due to leave the first location within the predetermined time period and updating the vehicle availability report using a result of each determining step.

The present teachings also related to a system configured to perform a method for maintaining a vehicle availability report with respect to a first location comprising determining the number of vehicles of a first type within a predetermined geofence at the first location, determining the number of vehicles of the first type due to leave the first location within a predetermined time period, determining whether the number of vehicles of the first type within the predetermined geofence is more than, equal to or less than the number of vehicles of the first type due to leave the first location within the predetermined time period and updating the vehicle availability report using a result of each determining step.

According to an embodiment of the present invention there is provided a method for determining if a vehicle should be checked in at a return station comprising receiving a first assignment for the vehicle from a fleet management system, receiving a location of the vehicle from an on-board telematics unit, determining that the location is within a geofence of the return station, receiving a second assignment for the vehicle from a fleet management; system, and determining that the vehicle should be logged as checked in at the return station and the first assignment terminated and replaced with the second assignment.

The method may further comprise receiving a subsequent location of the vehicle from the on-board telematics unit a predetermined time after receiving the first location.

Optionally determining that the vehicle should be logged as checked in at the return station occurs if it is determined that the subsequent location is within the geofence of the return station.

The method may further comprise sending a message to the fleet management system to terminate the first assignment upon determining that the vehicle should be logged as checked in at the first location.

Optionally the message to the fleet management system comprises at least one of identification information for the return station, an odometer reading for the vehicle, a fuel reading for the vehicle and an indication that the vehicle was involved in a collision.

Optionally, the first assignment for the vehicle is the opening of a rental contract for the vehicle.

Optionally, the second assignment for the vehicle is the opening of a second rental contract for the vehicle.

Optionally, at least one of the first and second assignment is the assignment of the vehicle to a non revenue task.

Optionally, the message to terminate the first assignment indicates that a rental contract for the vehicle should be closed.

Optionally, receiving the location of the vehicle comprises receiving the corresponding time that the vehicle was at the location.

Optionally, the location of the vehicle is received periodically along with the corresponding time.

The method may comprise accessing a database of geofences to determine if the received location is within one of the geofences. In this way, it can be determined if the vehicle is within a geofence of a return station.

Another method for determining if a vehicle should be checked in at a return station in accordance with the present teachings comprises receiving an assignment for the vehicle from a fleet management system, periodically receiving a location of the vehicle from an on-board telematics unit, determining that the location is within a geofence assigned to the return station, determining that the vehicle has remained at the return station for a predetermined period of time, and determining that the vehicle should be logged as checked in at the return station and the first assignment terminated and replaced with a second assignment.

The method may further comprise sending a message to the fleet management system to terminate the first assignment upon determining that the vehicle should be logged as checked in at the first location.

Optionally, the message to the fleet management system comprises at least one of identification information for the return station, an odometer reading for the vehicle, a fuel reading and an indication that the vehicle was involved in a collision.

Optionally, the first assignment for the vehicle is the opening of a rental contract for the vehicle.

Optionally, the second assignment of the vehicle is the opening of an electronic record assigning the vehicle to the first location.

Optionally, at least one of the first and second assignment is the assignment of the vehicle to a non revenue task.

Optionally, the message to terminate the first assignment indicates that a rental contract for the vehicle should be closed.

Optionally, receiving the location of the vehicle comprises receiving the corresponding time that the vehicle was at the location.

A further method for determining if a vehicle should be checked in at a return station in accordance with the present teachings comprises receiving a first assignment for the vehicle from a fleet management system, receiving a first location of the vehicle from an on-board telematics unit, determining that the first location is within a geofence of the return station, waiting a predetermined period of time for a second assignment for the vehicle from a fleet management system, receiving a second location of the vehicle from an on-board telematics unit, determining that the second location is not within the geofence of the return station, and determining that the vehicle should be not logged as checked in at the return station and that the first assignment should be maintained if a second assignment for the vehicle has not been received and the second location is not within he geofence of the return station.

The present teachings also relate to a respective computer readable medium having stored thereon a program, which when executed by a computer, performs at least one of above outlined methods of determining if a vehicle should be checked in at a return station.

A system configured to perform at least one of the above outlined methods of determining if a vehicle should be checked in at a return station is also envisaged.

According to another embodiment of the present invention there is provided a method for providing targeted advertisement to a driver of a vehicle comprising receiving rental information with respect to a driver and associated vehicle from a vehicle rental system, receiving geolocation information with respect to the vehicle from an on board unit of the vehicle, providing the rental information and the geolocation information to an advertising platform, wherein the advertising platform compares the received information with a set of predetermined criteria and if the criteria is met provides an advertisement corresponding to the criteria to the driver.

Optionally, the rental information with respect to the driver includes a least one of the driver's name, age, sex, occupation, personal interests and driver safety score.

Optionally, the rental information with respect to the vehicle includes at least one of vehicle identification number, corresponding on board unit, vehicle make and model and vehicle transmission.

Optionally, the rental information further includes at least one of a location where the vehicle is rented, the location where the vehicle should be returned, the length of the rental contract, the time remaining before the rental contract expires, purpose of the rental, whether a baby seat was rented and whether the vehicle was upgraded with respect to a rental booking.

The method may further comprise the vehicle rental system collating the rental information when a rental contract is opened for the driver on the rental system.

Optionally, the geolocation information includes at least one of frequently entered geofences, total distance travelled and total distance previously travelled.

Optionally, the rental information and geolocation information are received by a telematics system.

The telematics system may store the rental information and geolocation information.

The method may further comprise the telematics system comparing the geolocation information to at least one stored geofence to determine if the vehicle entered the at least one stored geofence.

Optionally, providing the geolocation information to the advertising platform comprises providing information identifying the stored geofence that the vehicle entered.

Optionally the telematics system compares the received rental information and geolocation information with stored rental information and geolocation information to determine if the driver has previously rented a vehicle.

Optionally, if it is determined that the driver has previously rented a vehicle, stored rental information and geolocation information for the driver is provided to the advertising platform.

Optionally, the advertising platform providing an advertisement to the driver comprises sending the advertisement to at least one of the on board unit and a mobile phone of the driver.

The method may further comprise determining that there exists more than one advertisement corresponding to the criteria, determining which advertisement has the highest rank and providing the highest ranked advertisement to the driver.

Optionally, a parameter associated with the respective advertisement is used to determine the ranking of an advertisement.

Optionally, a parameter may comprise at least one of maximum bid price, average number of people targeted, click through rate of advertisement and number of vehicles that have visited a location associated with the advertisement.

Optionally, each parameter may be normalized and a weight applied in order to determine the ranking of an advertisement.

The method may further comprise the advertising platform creating an advertisement campaign, the advertising campaign being created by associating an advertisement with predetermined criteria.

The present teachings also relate to a respective computer readable medium having stored thereon a program, which when executed by a computer, performs the above outlined method for providing targeted advertisement to a driver of a vehicle.

A system configured to perform at least one of the above outlined method for providing targeted advertisement to a driver of a vehicle is also envisaged.

BRIEF DESCRIPTION OF THE DRAWINGS

The present application will now be described with reference to the accompanying drawings in which.

DETAILED DESCRIPTION of THE DRAWINGS

Figure 1:
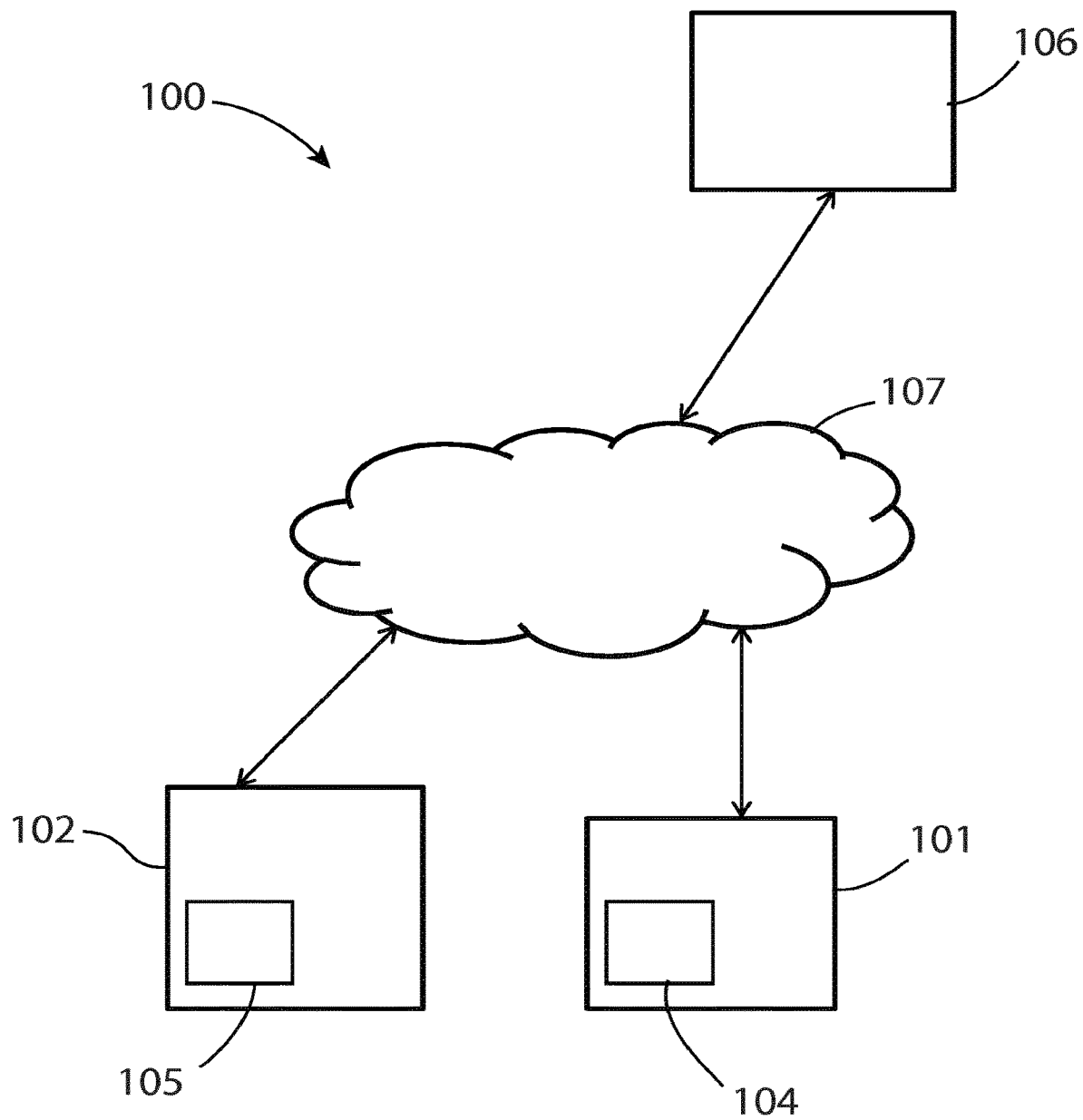
FIG. 1 is a block diagram of a conventional architecture for a vehicle telematics system.
Figure 2:
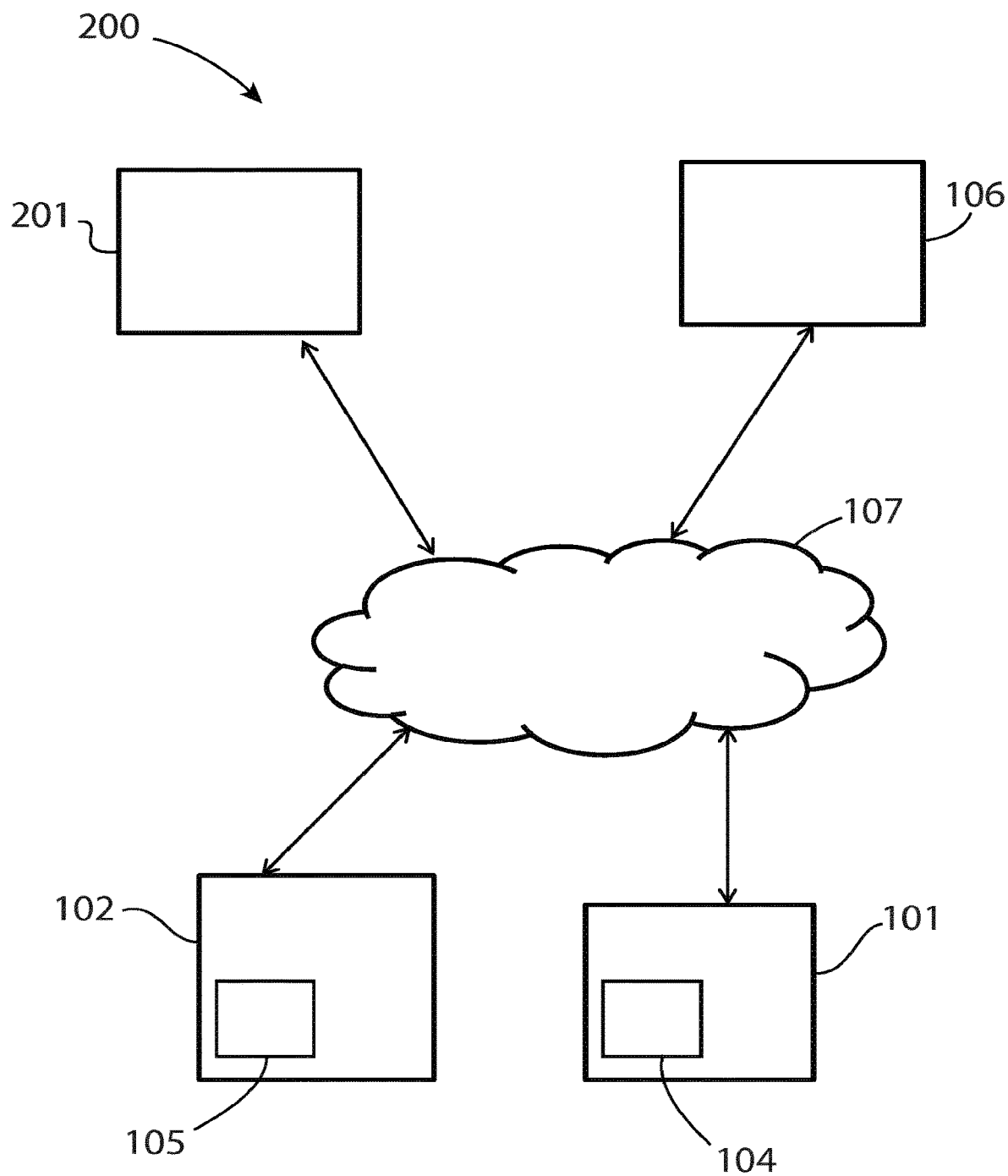
FIG. 2 is a block diagram of a system employing telematics data and fleet management data in accordance with the present teachings.

The inventors of the invention in accordance with the present teachings have found that correlating fleet management data with telematics data results in benefits in management of a fleet of vehicles. The architecture 200 of the system in accordance with the present teachings in shown in FIG. 2. While this exemplary embodiment is described with reference to a vehicle rental system, it will be appreciated that any vehicle management system may be used. This architecture differs from the conventional system of FIG. 1 in that a rental or leasing system 201 is provided, which can communicate with and provide data to the TSP 106. As will be explained in more detail hereinafter, data from the rental or leasing system (RLS) 201 and data from the Telematics Service Provider (TSP) system 106 is correlated or analyzed to provide improved vehicle fleet management.

The rental and leasing data which is analyzed and used by the present teachings (i.e., the data provided by the RLS 201) includes but is not limited to:—

Figure 3:
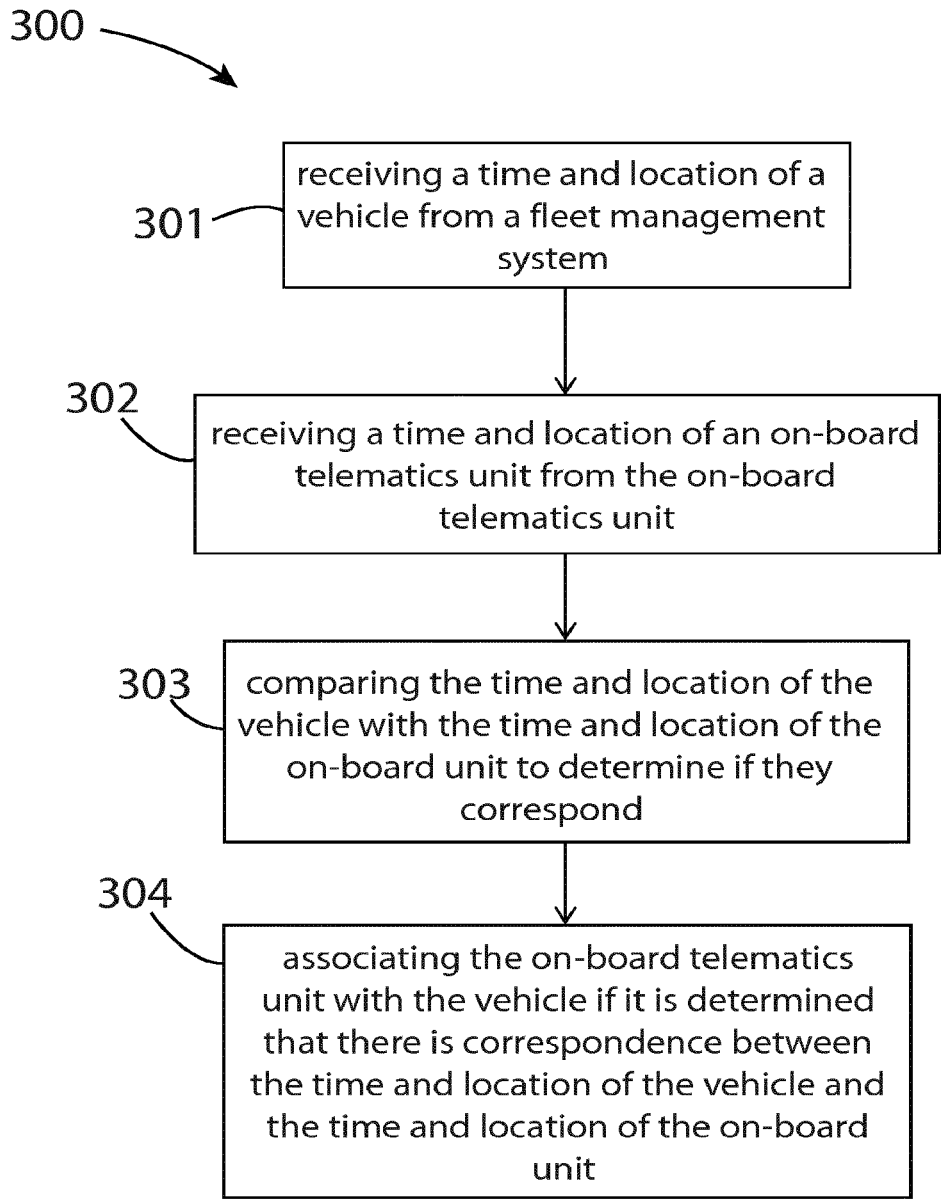
FIG. 3 is a flow diagram for a method of associating an on board telematics unit with a vehicle in accordance with the present teachings.

Customer/driver data
  Name, date of birth, address, driving license number, phone number and nationality
Vehicle data
  Unique vehicle ID, registration, make, model, version, color, due off date, due off kilometers, supplier, category and status
Rental or lease data
  Contract number, current location, due back location, date time out, date time return, driver id, customer name, color, due off date, due off kilometers, supplier, category and status
Non-revenue movement (NRM) data
  Unique number, movement type, location out, location due back, date out, date back, supplier name, drivers name, registration, driver phone number and reason The telematics data which is correlated by the present teachings (i.e., the data provided by the TSP 106) includes but is not limited to:—
  Vehicle speed
  Vehicle acceleration
  Vehicle position
  Impact data and analysis Driver safety scores OBD diagnostic information Driver infotainment service usage data A first embodiment in accordance with the present teachings of correlating rental data and telematics data will now be described with reference to FIG. 3. As is known in the art, several manual tasks are required to set up and run a telematics system for a fleet management organization such as rental or leasing company. Firstly, when vehicles are added to a fleet, they need to have an OBU installed. After installing the OBU, a user needs to send the OBU device ID (IMEI) and vehicle license plate number (LPN) to the telematics system so it can determine which vehicle the OBU is tracking and sending data for. This process is known in the art as "onboarding".

There are a number of methods for "onboarding" a vehicle. The user may upload the relevant data using a variety of methods including submitting the data manually through an online form or taking a picture of the device IMEI and vehicle LPN/registration for upload. As this is a manual process, it is both error prone and time consuming to input. It is time consuming to fill out forms and upload data and it is error prone as a user could input the wrong data or upload the wrong image or a blurry image for a vehicle. Users providing incorrect inputs may result in data getting incorrectly processed and consequently incorrect insights or actions may be presented to the user.

An embodiment of the invention in accordance with the present teachings uses data correlation and machine learning to discover or determine IMEI-LPN associations i.e., OBU-vehicle associations. This embodiment of the present teachings removes the need for a user to provide any association input after installing a telematics device on a vehicle. The TSP 106 correlates the data from the rental or leasing software system 201 with the telematics data from the vehicles 101, 102 to learn the correct device-to-vehicle associations. Whenever a customer rents or leases a vehicle, a contract is opened on the rental software system 201. The data in a contract/record includes the LPN of the vehicle, the station ID (SID) of where the vehicle was rented/leased from and date/time that the rental or lease commenced. As is known in the art, an SID is a unique identifier for a key location in the rental or leasing system. For example a rental branch, pick up location, garage and bodyshop would all have SIDs. SIDs are used to track the locations of the vehicles in the fleet. It will be appreciated that in fleet management systems other than rental systems, a contract may not be opened. However, an electronic record containing essentially the same information as the contract may be created. For example, in haulage companies, a similar record as a contract may be opened each time a vehicle is assigned a (haulage) task. This is similar to the creation of non revenue movement (NRM) record for a rental system as will be explained in more detail below.

When a rental or leasing contract is closed, the LPN, the SID of the station to which the vehicle is returned and date/time of contract closure are all logged in the RLS 201. This data can also be correlated with the telematics data sent from the OBU 104, 105 in the vehicle to learn the vehicle-to-device associations.

In addition, data from Non-revenue movement (NRM) can also be used by the TSP 106 to learn the association between an OBU and a vehicle. Whenever an NRM is recorded the date/time of the movement, the LPN and the SID of the start and end of movement are all recorded. The procedure for a NRM is similar to the rental procedure. However, instead of opening a contract for a customer, a NRM record is opened in system, which included similar data as in a rental contract i.e., the position of the vehicle (for which a NRM record is opened) at a particular time is stored the NRM record along with the above mentioned data.

With reference to FIG. 3, the specific steps of the method 300 of associating an on-board telematics unit with a vehicle performed by the TSP 106 are outlined.

Step 301: receiving a time and location of a vehicle from a fleet management system;

Step 302: receiving a time and location of an on-board telematics unit from the on-board telematics unit;

Step 303: comparing the time and location of the vehicle with the time and location of the on-board unit to determine if they correspond;

Step 304: associating the on-board telematics unit with the vehicle if it is determined that there is correspondence between the time and location of the vehicle and the time and location of the on-board unit.

The OBU and the vehicle may be associated with each other if it is determined that the time and location of the vehicle and the time and location of the on-board unit correspond a predetermined number of times. For example, if the vehicle and the on-board unit are at the same location three times within a certain time period, the OBU is considered to be installed in the vehicle and the vehicle and OBU are associated with each other.

Further steps of the method (not shown in FIG. 3) may include increasing a confidence level that the on-board telematics unit is associated with the vehicle if it is determined that the time and location of the vehicle corresponds to the time and location of the on-board unit correspond; and decreasing the confidence level if it is determined that the time and location of the vehicle with the time and location of the on-board unit do not correspond.

The process for learning associations can be further improved by adding a step to check if the difference in mileage recorded by the RLS at the time the rental or NRM movement is opened and closed is the same as the mileage recorded by the OBU.

Associating the on-board telematics unit with the rental vehicle may comprise processing all telematics data from the on-board telematics unit as indicating a time and location of the vehicle.

As will be explained in more detail below, associating the on-board telematics unit with the rental vehicle may comprise disassociating the on-board telematics unit with a second rental vehicle. That is, an on-board unit may already be (incorrectly) associated with a vehicle and the on-board unit must be disassociated from the incorrect vehicle before associating it with the correct vehicle.

The fully automated process for associating an on-board unit with a vehicle is described in more detail with reference to FIG. 4. While this exemplary embodiment is described with reference to a rental system, it will be appreciated that any fleet management system many be used.

At step 401, a customer service representative (CSR) inputs data to the rental system 201 e.g., at a user terminal in a vehicle rental office. The data entered each time a customer contract is opened includes the LPN of the vehicle being rented, the SID and the date/time that the vehicle is being rented from. At step 402, the data or contract details are provided to the TSP 106. The TSP is also provided with an OBU IMEI, position of the OBU and date/time corresponding to the position in step 403. This information is provided by the OBU 104, 105 periodically to the TSP 106. At this point in time, the TSP can receive information from the OBU but it has not associated the OBU with any particular vehicle in the fleet.

At step 404, the TSP 106 correlates the contract data received from the RLS 201 and the vehicle position data received from the OBU. At step 405, the TSP decides to increase or decrease a confidence rating that the OBU should be associated with the vehicle corresponding to the contract data. At step 406, if the confidence rating has increased above a predetermined threshold, the TSP associates the OBU with the vehicle identified in the contract data.

It will be appreciated that the predetermined threshold may be chosen as appropriate by the person skilled in the art. For example, the predetermined threshold may be a predetermined integer. In this scenario, increasing a confidence level comprises increasing the confidence level by a factor of one. Furthermore, decreasing the confidence level may comprise decreasing the level by a factor of one.

The teachings in accordance with the present disclosure can also use contract data obtained when a customer contract is closed (step 407) in order to associate an OBU with a vehicle. For example, an OBU may not have been associated with a vehicle by the time a contract for that vehicle is closed. However, using rental information obtained from closing the contract, an association may be made.

Steps 407-412 mirror previously described steps 401-406, respectively. At step 407, a customer service representative (CSR) inputs data to the rental system 201 e.g., at a user terminal in a vehicle rental office. The data entered each time a customer contract is closed includes the LPN of the vehicle being returned, the SID and the date/time that the vehicle is being returned to. At step 408, the data or contract details are provided to the TSP 106 i.e., time and location data for the vehicle is provided to the TSP. The TSP is also provided with an OBU IMEI, position of the OBU and date/time corresponding to the position in step 409. This information is provided by the OBU 104, 105 periodically to the TSP 106.

At step 410, the TSP 106 correlates the contract data received from the RLS 201 and the vehicle position data received from the OBU. At step 411, the TSP decides to increase or decrease a confidence rating that the OBU should be associated with the vehicle corresponding to the contract data. At step 412, if the confidence rating has increased above a predetermined threshold, the TSP associates the OBU with the vehicle identified in the contract data.

A specific example of using the method 300 of associating an OBU with a rental vehicle in accordance with the present teachings is outlined below:

Using the data from the rental system (e.g., data received in step 301), the TSP system learns that a vehicle with LPN L1 has moved from location SID S1 at approx. time T1 to SID S2 at approx. time T2

From the rental data—L1:S1 (T1)→S2(T2)

Using telematics data from the OBU with IMEI 11 (e.g., received in step 302), the TSP system learns that 11 has moved from a geofenced area that matches the SIDs S1 at approx. time T1 and arrived at SID S2 at approx. timeT2.

From the telematics data—11:S1 (T1)→S2(T2)

The TSP correlates this data and determines that L1 :11 are potentially associated as according to both datasets they moved to and from the same locations at roughly the same time. The TSP increases the confidence level of this association Increase confidence of L1:11 association If a movement is recorded which is contrary to the assertion that L1 and 11 are associated, then the confidence level of this association will be decreased.

When the confidence level of an association increases beyond a certain threshold then all processing performed by the TSP will assume the association to be true.

This system and method for associating an on-board telematics unit with a rental vehicle can be completely automatic or it can override a user inputted association. That is, in some scenarios, a user may have erroneously linked or associated an OBU with a specific vehicle when it should have been linked with a different vehicle. The present teachings provide a method of overriding or correcting this erroneous association.

Figure 5:
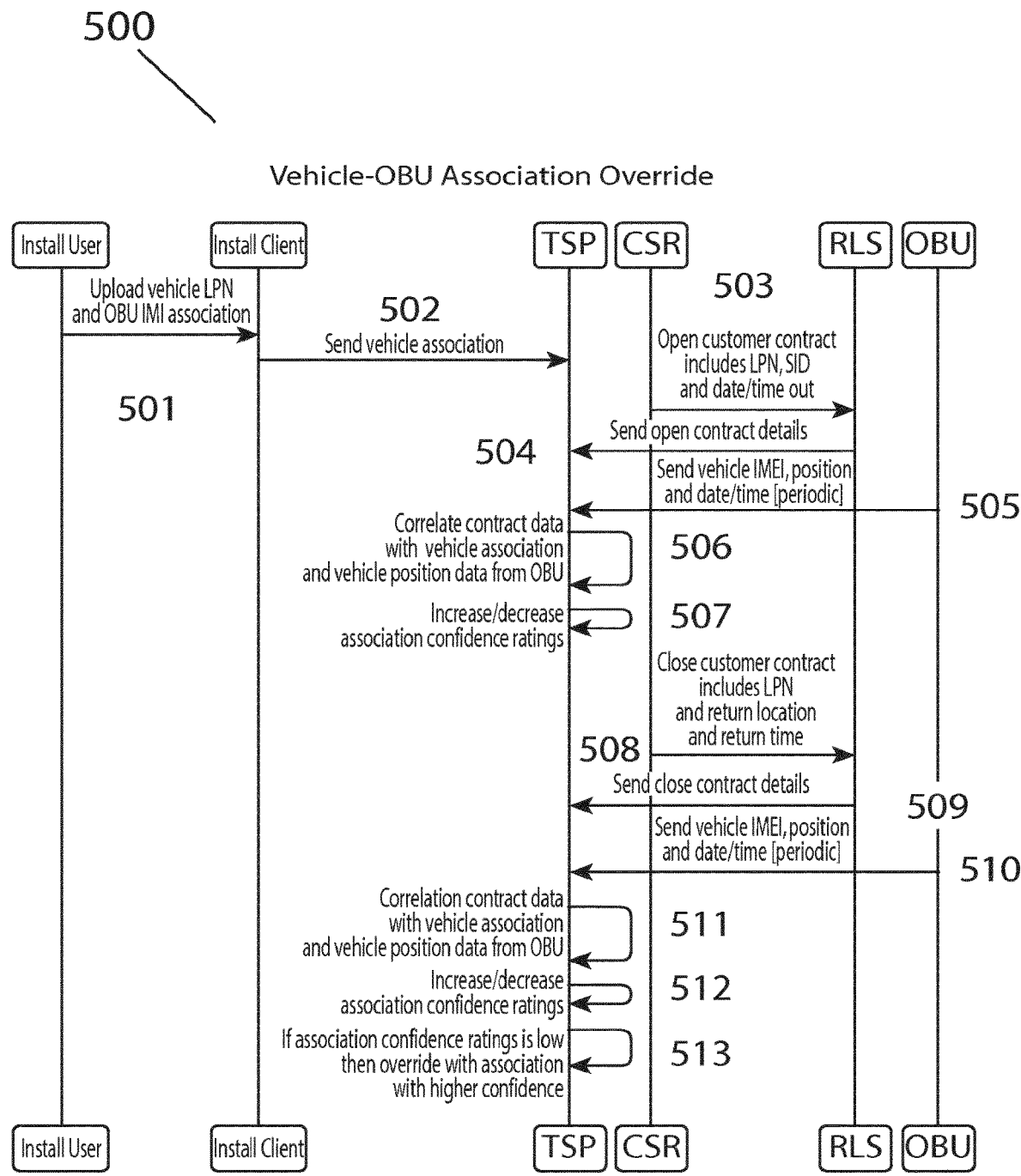
FIG. 5 is also a flow diagram for a method of associating an on board telematics unit with a vehicle in accordance with the present teachings.

The method for overriding or correcting a user inputted association between an OBU and a vehicle is now described with reference to FIG. 5. At step 501, a user (install user) communicates with a client (install client) to upload or input a vehicle license plate number (LPN) and OBU IMEI for association. For example, this could involve the installer of the OBU using an on-line web form (or a mobile app) to input/upload the LPN and OBU IMEI. It will be appreciated that any number of methods may be used by the user to associate the OBU with a vehicle in step 501. Furthermore, it will be appreciated that the step 501 carried out by a user is prone to human error.

At step 502, the association between an OBU and a vehicle as input/uploaded by a user is provided to a Telematics Service Provider (TSP), e.g., TSP 106.

Figure 4:
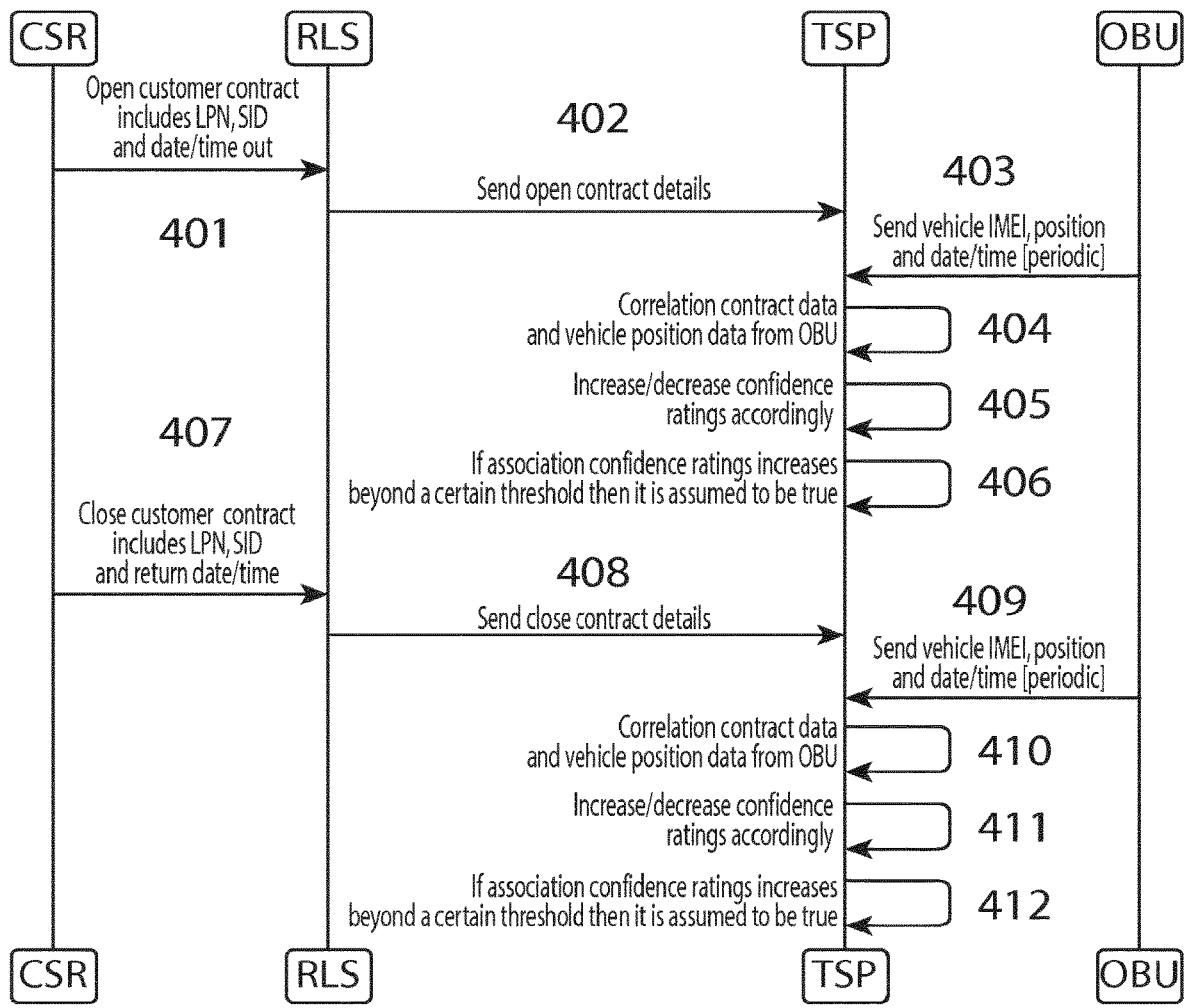
FIG. 4 is also flow diagram for a method of associating an on board telematics unit with a vehicle in accordance with the present teachings.

At step 503, a similar step as outlined in step 401 of FIG. 4 is carried out. That is, a customer service representative (CSR) inputs data to the rental system 201 e.g., at a user terminal in a vehicle rental office. The data entered each time a customer contract is opened includes the LPN of the vehicle being rented, the SID and the date/time that the vehicle is being rented from.

At steps 504, contract details such as the aforementioned LPN of the vehicle being rented, the SID and the date/time are provided to the TSP by the TLS. In step 505, the TSP is provided with an OBU IMEI, position of the OBU and date/time. At step 506, the TSP compares the time and location of the vehicle with the time and location of the on-board unit to determine if they correspond. At step 507, a confidence level that the on-board telematics unit is associated with the vehicle is increased or decreased based on the comparison. It is possible to make association at this point in time i.e., after step 507 if the confidence rating has reached a predetermined threshold. However, there are scenarios where further data is needed before an override can be performed (i.e., before the threshold can be reached) and the method proceeds to step 508.

At step 508, a customer representative closes the contract for the vehicle. At step 509, the RLS informs the TSP that the rental contract has been closed for the vehicle. In step 509, the TSP is also provided with the LPN of the vehicle being returned, the SID and the date/time that the vehicle is being returned to. At step 510, the OBU provides the TSP with an OBU IMEI, position of the OBU and date/time corresponding to the position.

At step 511, the position and time data received from OBU and RLS are compared or analyzed. At step 512, the confidence level is raised or lowered as appropriate (as previously described). For example, the confidence level that current association between an on board unit and a vehicle may be lowered and the confidence level of an association of the on board unit with another vehicle may be increased.

At step 513, if the TSP determines that the confidence level of the current association is below a predetermined threshold and the confidence level of another association is above a predetermined threshold, the current association is overridden.

A detailed example of overriding or correcting an association between an OBU and a vehicle is outlined below:
  User inputs an association of vehicle with LPN L1 to the OBU with IMEI I1. This association is sent and stored in the TSP system
    (From user input—L1:I1 association)
  Using the data from the rental system, the TSP system learns that the vehicle with LPN L1 has moved from location SID S1 to SID S3
    (From the rental data—L1:S1→S3)
  At the same time using the data from the OBU with IMEI I1, the TSP system also learns that according to the telematics data it has moved from a geofenced area that matches the SIDs S1 and S2.
    (From the telematics data—I1:S1→S2)
  All three assertions above cannot be true:—
    Vehicle with LPN L1 is associated with OBU with IMEI I1 (From user input—L1 :I1 association)
    Vehicle with LPN L1 has moved from SID S1 to S3 (From the rental data—L1:S1→S3)
    OBU with IMEI I1 has moved from SID S1 to S2 (From the telematics data —I1:S1→S2)
  The TSP now decreases the confidence level of this association
    (Reduce confidence of L1:I1 association)
  At the same time, the TSP system also learns that the vehicle with LPN L2 has moved from location S3 to S4 according to the rental system data (L2:S1→S2)
  This correlates to the movement of OBU with IMEI I1
  The TSP now increases the confidence of this association.
    (Increase confidence of L2:I1 association)
  The TSP increases the confidence level of an association as the number of correlation matches increases for that association (i.e. rental system data and telematics data agree).
  The TSP decreases the confidence level of an association as the number of correlation mismatches increases for that association.
  When the confidence level of an association that disagrees with a user's input increases beyond a certain threshold then this association overrides the user's input association.

As will be appreciated by the person skilled in the art, vehicles in a rental fleet have a short turnaround and are on-fleeted (added to the rental flee) and off-fleeted (removed from the rental fleet) frequently so it is important to automate and streamline the process for associating an OBU with a vehicle. The above outlined embodiment in accordance with the present teachings completely automates the onboarding process using data correlation and machine learning. Implementing this system and method means that a user is no longer required to input and send this onboarding data to the TSP. This reduces the onboarding time, the risk of error and the time taken to resolve these errors.

Another time-consuming process required when setting up a telematics system is the creation of geofences. As is known in the art, a geofence is a virtual perimeter for a real-world geographic area. Geofencing is the process of creating virtual boundaries around a location of interest. For a rental or leasing company, the locations of interest include branch offices, mechanics, body shops, holding areas and tire shops. It will be appreciated by the person skilled in the art that a rental/leasing company/system is merely exemplary and any vehicle fleet management system with corresponding locations of interest may be used. Once a geofence has been created for a location of interest, alerts are generated whenever vehicles enter and exit the boundaries of the geofence. The process of creating a geofence is time consuming and error prone. For example, if a user of a fleet management system wants to create a geofence around a location, the process involves navigating a map on a graphical interface to find the location and then drawing a shape around the location of interest to specify its co-ordinates.

Currently setting up a geofences for locations of interest is a manual process. Users need to draw the boundary of a geofence on a map using a shape (e.g. polygon, square, circle or free form). For a typical medium sized rental company this could require drawing hundreds of geofences. As this is a manual and error prone process, a geofence may have to be redrawn several times after weeks of testing to ensure its accuracy.

This embodiment of the invention in accordance with the present teachings uses data correlation and machine learning to discover or create geofence boundaries for a location. This embodiment of the present teachings removes the need for a user to create geofences manually. The TSP correlates the data from system with the telematics data from a vehicle(s) to learn the correct boundary for each geofence.

This embodiment of the invention can be used in conjunction with the previously described embodiment—associating an on-board telematics unit with a vehicle. Alternatively, this further embodiment can be used independently. That is, even if a manual process has been used to associate an OBU with a vehicle (and no override takes place), the method in accordance with the present embodiment of the present teachings can be used to create and/or edit a geofence.

In a similar manner as outlined above with regard to the previous embodiment, data from rental movement and Non-revenue movement (NRM) can be used to determine the location of vehicles. Whenever a rental contract or a NRM record is opened, a station identifier SID and a date/time is specified (e.g. SID="DUBT01" and time =09/11/2016 12:42:02). This SID is a "location of interest" for the rental company and therefore requires a geofence. The TSP automatically correlates this data (i.e. SID and date/time) with the position of that vehicle from the OBU at that time and applies machine learning rules. For example a rule could specify that if a vehicle is stationary in a position for a certain amount of time after a contract for that vehicle is closed or before a contract is open in a specific SID, then the TSP increases the confidence of that position being within the geofence of that SID. If the confidence rating goes above a certain threshold, then this position is included in the geofence. The confidence rating should only be increased if the vehicle is stationary for certain period to avoid adding positions of moving vehicles to the geofence. The more instances of correlation the more the system learns and increases its confidence of the boundary points of the geofence. It will be appreciated that an electronic record at the fleet management system containing essentially the same information as for the contract record or NRM record may be used to implement the present teachings.

Figure 6:
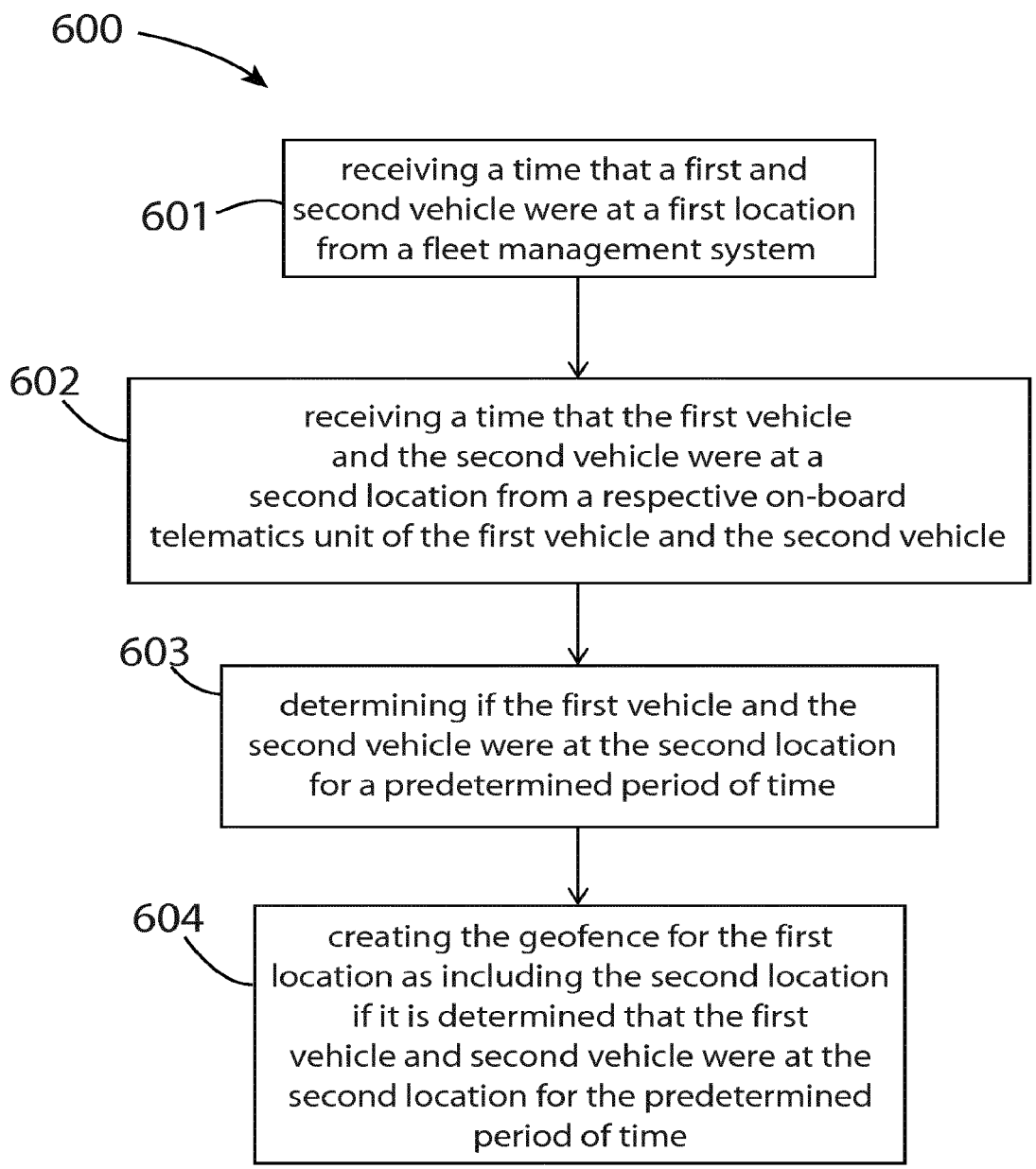
FIG. 6 is a flow diagram for a method of creating a geofence in accordance with the present teachings.

With reference to FIG. 6, the general steps of a method 600 of creating a geofence for a first location as performed by the TSP 106 are outlined.

Step 601: receiving a time that a first vehicle and a second vehicle were at the first location from a fleet management system;

Step 602: receiving a time, a second location and duration that the first vehicle and the second vehicle were at a second location from a respective on-board telematics unit of the first vehicle and the second vehicle;

Step 603: determining if the first vehicle and the second vehicle were at the second location for a predetermined period of time; and Step 604: creating the geofence for the first location as including the second location if it is determined that the first vehicle and second vehicle were at the second location for the predetermined period of time.

The following rules for correlation and learning may be used to determine a geofence for rental location DUBT01 may be used. However, it will be appreciated that these rules are merely exemplary and any specific rules may be set as appropriate.

The rules for increasing the confidence level of a specific boundary being inside a geofence for a specific SID are as follows:—

Vehicle has been stationary for more than 45 mins in one position prior to a contract opening (electronic record being created) for that vehicle.

Vehicle has been stationary for more than 45 mins in one position after a contract closing (electronic record closed) for that vehicle An exemplary rule for decreasing the confidence level of a specific area is as follows:—

The position has not been occupied for more than 30 days.

User feedback on geofences can be used to fine tune these rules/parameters. For example, a user can validate a system learned geofence or independently draw their own geofence for the same SID. Based on this feedback the system can tune its rules or parameters above to improve its algorithm for learning geofences.

Figure 7:
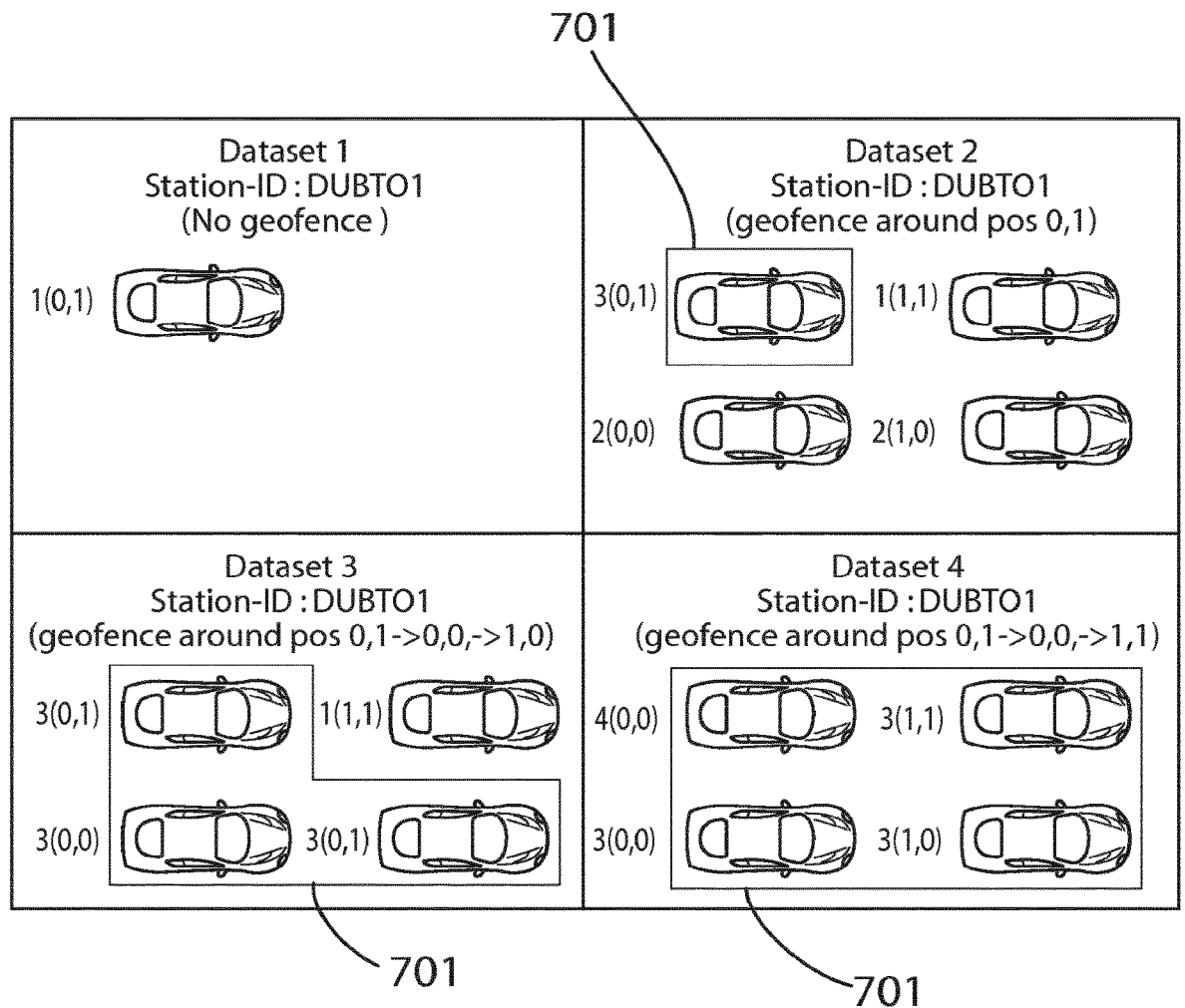
FIG. 7 is a diagram showing the creating of a geofence using a method in accordance with the present teachings.

Turning to FIG. 7, this figure shows a geofence being automatically created or drawn using data correlation and machine learning for SID DUBT01 and the exemplary rules given above. The numbers in the brackets are the X, Y position coordinate of the vehicle. These coordinates are kept simple for demonstration purposes only and are not indicative of real world coordinates. The number outside the bracket is the confidence level of the position (inside the brackets) being within the geofence.

Table 1 below shows the data events that would result in the geofence 701 of FIG. 7 being drawn/created given the exemplary machine learning rules outlined above. It can be seen that in the first dataset (Dataset 1), no geofence exists but as more data is gathered by the TSP, the geofence 701 is expanded. Although this exemplary embodiment is described with reference to a rental system, it will be appreciated that any vehicle fleet management system may be used. In such a system, a contract may not be opened but an electronic record including essentially the same information as provided in the contract would be opened or created.

TABLE 1

| Dataset | Rental Data (received from RLS 201) | Telematics Data (received from OBU 104/105) | Action | Confidence |
|---|---|---|---|---|
| 1 | Contract opened for vehicle A at 09:00 at SID DUBT01 | Vehicle A has been stationary in position 0, 1 for 3 hours prior to this (06:00-09:00) | Increase confidence rating of boundary around position 0, 1 by 1 | 1(0, 1) |
| 2 | Contract closed for vehicle B at 09:10 at SID DUBT01 | Vehicle B has been stationary in position 0, 1 for 2 hours after this (09:30-12:30) | Increase confidence rating of boundary around 0, 1 by 1 | 2(0, 1) |
| 2 | Contract closed for vehicle C at 09:20 at SID DUBT01 | Vehicle C has been stationary in position 2, 2 for a period of 15 mins after this (09:40-09:55) | Confidence levels remain the same as period threshold was not exceeded | 2(0, 1) |
| 2 | Contract opened for vehicle D at 09:25 at SID DUBT01 | Vehicle D has been stationary in position 0, 0 for 2 hours prior to this (06:25-09:25) | Increase confidence rating of boundary around 0, 0 to 1, | 1(0, 0) 2(0, 1) |
| 2 | Contract opened for vehicle E at 09:40 at SID DUBT01 | Vehicle E has been stationary in position 1, 1 for 1 hour prior to this (08:30-09:30) | Increase confidence rating of boundary around position 1, 1 by 1 | 1(0, 0) 2(0, 1) 1(1, 1) |
| 2 | Contract closed for vehicle F at 09:50 at SID DUBT01 | Vehicle F has been stationary in position 1, 0 for a period 3 hour 15 mins after this (10:00-13:15) | Increase confidence rating of boundary around 1, 0 by 1 | 1(0, 0) 2(0, 1) 1(1, 0) 1(1, 1) |
| 2 | Contract opened for vehicle G at 10:00 at SID DUBT01 | Vehicle G has been stationary in position 0, 0 for 4 hours prior to this (06:00-10:00) | Increase confidence rating of boundary around position 1, 0 by 1 | 2(0, 0) 2(0, 1) 1(1, 0) 1(1, 1) |
| 2 | Contract opened for vehicle H at 10:10 at SID DUBT01 | Vehicle H has been stationary in position 1, 0 for 2 hour 30 mins prior to this (07:50-10:10) | Increase confidence rating of boundary around position 1, 0 by 1 | 2(0, 0) 2(0, 1) 2(1, 0) 1(1, 1) |
| 2 | Contract closed for vehicle I at 10:20 at SID DUBT01 | Vehicle I was stationary in position 0, 1 for 2 hour 30 mins prior to this (07:50-10:10) | Increase confidence rating of boundary around position 1, 0 by 1. Draw a geofence for SID DUBT01 around 0, 1 as it has exceeded confidence threshold | 2(0, 0) 3(0, 1) 2(1, 0) 1(1, 1) |
| 3 | Contract opened for vehicle J at 10:30 at SID DUBT01 | Vehicle J has been stationary in position 0, 0 for 1 hour 30 mins prior to this (09:00-10:30) | Increase confidence rating of boundary around position 0, 0 by 1. Draw a geofence for SID DUBT01 around 0, 0 and 0.1 as both have exceeded confidence threshold | 3(0, 0) 3(0, 1) 2(1, 0) 1(1, 1) |
| 3 | Contract opened for vehicle K at 10:40 at SID DUBT01 | Vehicle K has been stationary in position 1, 0 for 2 hours prior to this (08:40-10:40) | Increase confidence rating of boundary around position 1, 0 by 1. Draw a geofence for SID DUBT01 around 0, 0, 0, 1 and 1, 0 as they | 3(0, 0) 3(0, 1) 3(1, 0) 1(1, 1) |

TABLE 1-continued

| Dataset | Rental Data (received from RLS 201) | Telematics Data (received from OBU 104/105) | Action | Confidence |
|---|---|---|---|---|
| | | | have exceeded confidence threshold | |
| 4 | Contract opened for vehicle L at 10:45 at SID DUBT01 | Vehicle L has been stationary in position 1, 1 for 3 hours prior to this (07:45-10:45) | Increase confidence rating of boundary around position 1, 1 by 1 | 3(0, 0) 3(0, 1) 3(1, 0) 2(1, 1) |
| 4 | Contract closed for vehicle M at 11:00 at SID DUBT01 | Vehicle M was stationary in position 0, 0 for 2 hours prior to this (09:00-11:00) | Increase confidence rating of boundary around position 0, 0 by 1 | 4(0, 0) 3(0, 1) 3(1, 0) 2(1, 1) |
| 4 | Contract closed for vehicle N at 11:10 at SID DUBT01 | Vehicle N was stationary in position 1, 1 for 1 hour prior to this (10:10-11:10) | Increase confidence rating of boundary around position 1, 1 by 1. Draw a geofence for SID DUBT01 around 0, 0, 0, 1, 1, 0 and 1, 1 as they have all exceeded the confidence threshold | 4(0, 0) 3(0, 1) 3(1, 0) 3(1, 1) |

It will be appreciated from the above table 1 that although different vehicles are identified (vehicles A-N), a single vehicle (or single OBU) may be used to gather data in order to create a geofence for a location. However, the more data the telematics system receives from the rental system and telematics device (OBU) the more it learns about the shape of the geofence. Accordingly, if a plurality of vehicles are used, more data will be received in a shorter period of time.

Figure 8:
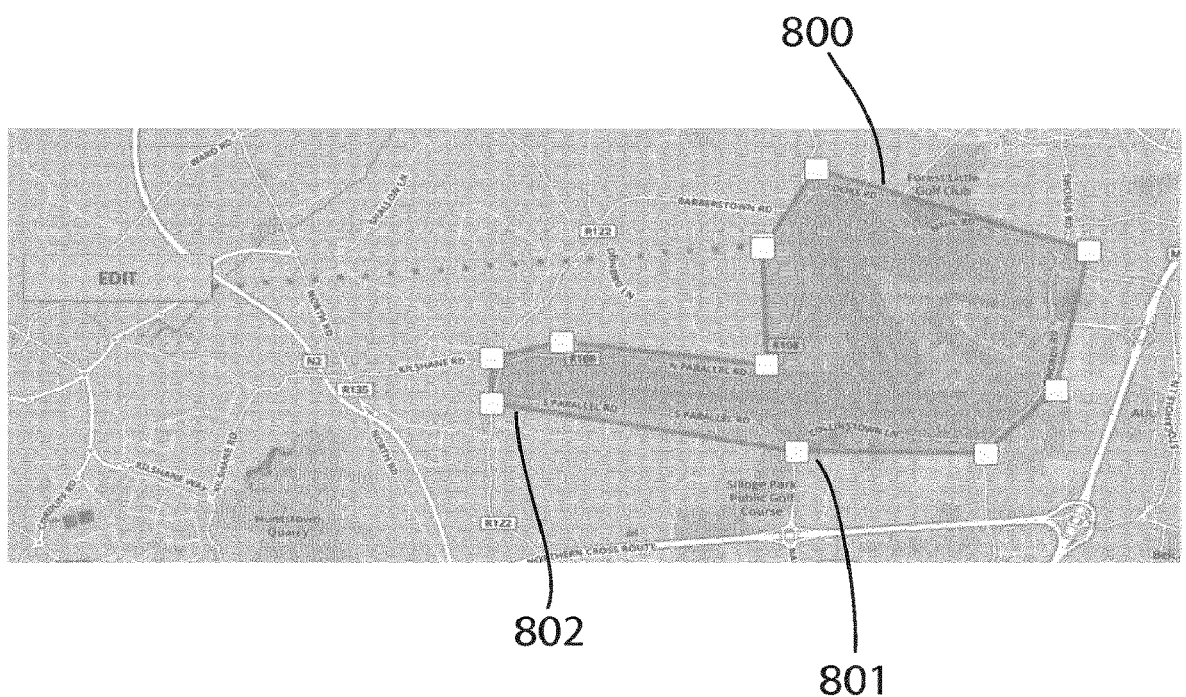
FIG. 8 is a diagram of a map showing an exemplary geofence for a location in accordance with the present teachings.

Turning to FIG. 8, a map showing an exemplary geofence for SID DUBT01. This geofence 800 contains a number of geographical positions 801, 802. For example, position 801 may have coordinates 0, 1 as described above, position 802 may have coordinates 1, 1. As is known to those skilled in the art, the geofenced area 800 is a relative small area around a location SID DUBT01. Once a geofence has been created, alerts may be provided to the rental system each time the geofence 800 is crossed by a vehicle. For this example, the rental system will be made aware if a vehicle has arrived at SID DUBT01 (entered the geofenced area) or has left SID DUBT01 (left the geofenced area).

The same algorithm or method can be used to create geofences for the nonrevenue locations (SIDs) by correlating NRM data with telematics data and applying machine learning. As previously mentioned, a NRM record must be opened before a non-revenue movement can occur for a vehicle. When a NRM record is opened (and closed), similar information is recorded for the vehicle in question as for opening and closing a rental contract. Non-revenue SIDs include mechanical repair shops, electricians, interior trimers, body repairs shops, branches and trade shows/conference SIDs. The learning algorithm can be tuned to discover sub-geofences within a geofence for given SID. For example, individual geofences corresponding to cleaning bays, returned parking bays and available parking bays may want to be created. Machine learning rules for determining these sub-geofences can be based on the knowledge that a car is usually first parked in a return parking bay, then it is moved in cleaning bay and then finally it is moved to an available parking bay. By analyzing stop/start patterns, movement and clustering of vehicle, the system can learn how to determine these sub-geofences within a SID. Again, a large dataset plus user feedback can help tune the parameters of these algorithms to improve the identification of these geofences and sub-geofences.

It will be appreciated by those skilled in the art that the above outlined embodiment for created geofences by correlating location and time data results in an advantageous system and method. The method is fully automated such that creating geofences for locations of interest for a vehicle fleet system is no longer a time consuming task that must be performed by a user. This reduces the installation time, the risk of error and the time taken to resolve these errors.

Another embodiment of the teachings in accordance with the present disclosure involves a method of correlating data from a fleet management system with telematics data to perform automated stock checks.

Another embodiment of the teachings in accordance with the present disclosures involves a method of correlating fleet management system data with telematics data to automatically check in vehicles upon their return to a station or depot. As is known in the art, currently checking in a vehicle is largely a manual task. The administration or return agent must take note of the vehicle registration, the vehicle's fuel reading and current mileage on the vehicle. The return agent also needs to examine the vehicle for any damage. They then close the contract on the fleet management system or rental system (RLS) with the updated mileage, fuel reading and details of any damage (if applicable) along with the current date and time.

The present teachings allow the above process to be fully automated. To fully automate this process, the telematics service provider (TSP) can track the mileage (distance travelled) of the vehicle throughout its rental using the OBU of the vehicle. When the vehicle returns to the station/depot, it will enter the geofence for the return station-id. Once it crosses this geofence, the TSP can trigger for the contract to be closed on the RLS with the current date and time, fuel and with the mileage for the rental. If the TSP has detected an impact at any point during the rental period, the return agent will be alerted to inspect the vehicle for damage. Consequently, the whole process of checking in a vehicle is automated. Of course, if an impact has been detected, manual intervention is required to perform the inspection.

A method for automatically checking in a vehicle at a station in accordance with the present teachings may comprise the steps of receiving assignment information for the vehicle from a fleet management system, the information indicating that the vehicle has been assigned to a first task; receiving a time and location of the vehicle from an on-board telematics unit; determining that the location is within a geofence of the return station; receiving assignment information for the vehicle from a fleet management system, the information indicating that the vehicle has been assigned to a second task, and providing vehicle time and position information regarding the first task to the fleet management system.

Another method for automatically checking in a vehicle at a return station in accordance with the present teachings may comprise the steps of receiving assignment information for the vehicle from a fleet management system, the information indicating that the vehicle has been assigned to a task, receiving a time and location of the vehicle from an on-board telematics unit, determining that the location is within a geofence of the return station, periodically receiving the time and location of the vehicle from an on-board telematics unit, and providing vehicle time and position information regarding the task to the fleet management system if it is determined that the vehicle has remained within the geofence of the return station for a predetermined period of time.

Figure 9:
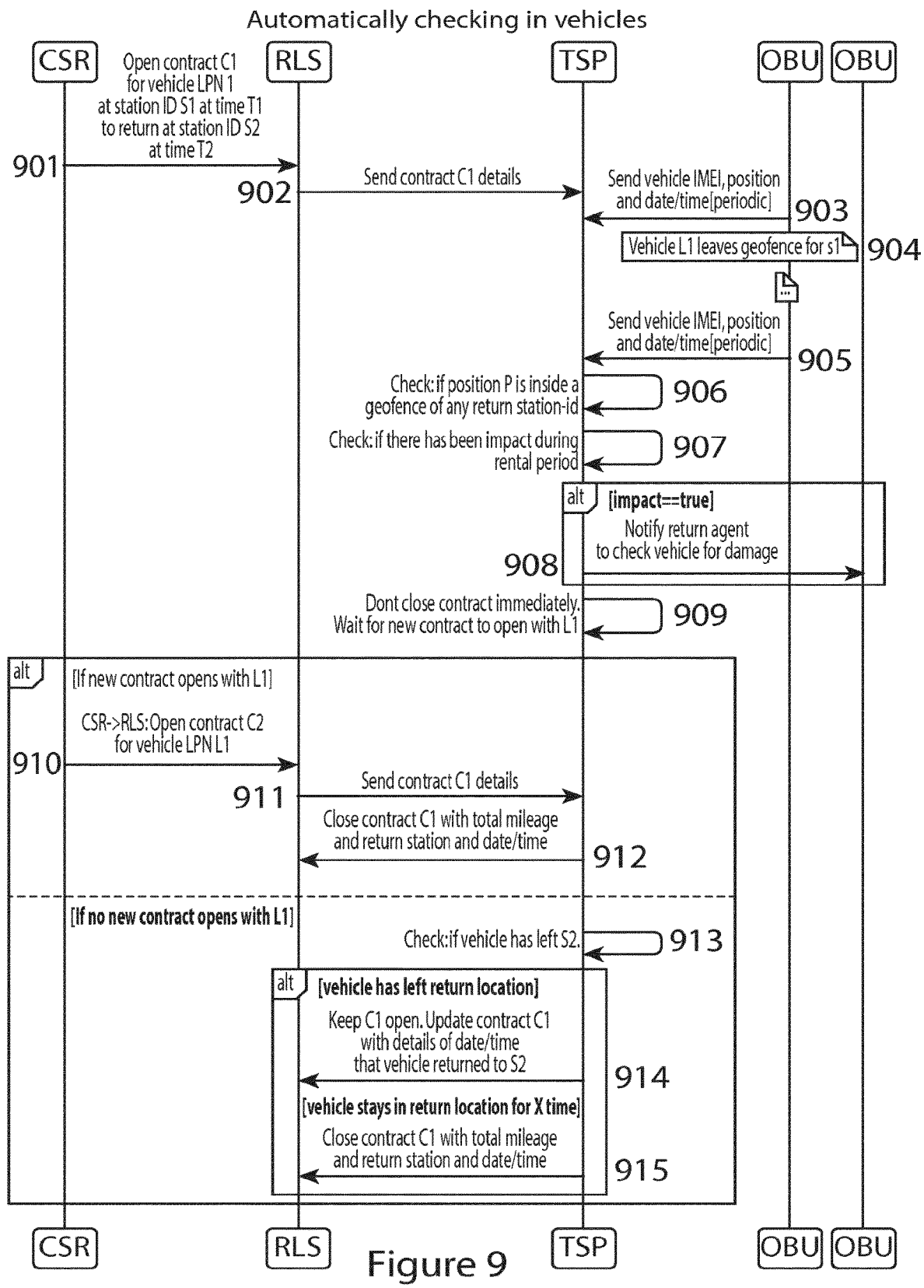
FIG. 9 is a flow diagram for a method of automatically checking in vehicles in accordance with the present teachings.

A specific example of determining if a vehicle should be automatically checked-in in accordance with the present teachings is now described with reference to FIG. 9. It will be appreciated that although this example is provided with reference to a rental system RLS, any vehicle fleet management system may be used in place of the RLS.

At step 901, a customer service representative CSR opens a contract C1 for a vehicle L1 at station ID S1 at time T1 and specifies that the vehicle is due to return to S1 at time T2. At step 902, these details are sent from the RLS to the telematics system TSP. The OBU of the vehicle begins reporting its position to the TSP—step 903. At step 904, the vehicle leaves the geofence for station S1. The OBU unit periodically sends position data for the vehicle to the TSP—step 905. When the vehicle OBU reports a position inside a geofence (step 906) that is mapped to a return station (S1/S2) then the TSP checks (step 907) if the vehicle has been involved in an impact. If the vehicle has been involved in an impact, the TSP notifies the return agent to check the vehicle—step 908. Step 908 can also or alternatively include sending a message to the RLS highlighting a potential impact. The customer service representative is prompted by the RLS to perform a manual inspection of the returned vehicle.

The TSP becomes aware of Impacts if the OBU sends a signal(s) which indicates that the vehicle experienced significant G-force/acceleration/deceleration during the period of the rental i.e., between the time that the contract was opened at step 901 and the return to the station at step 906. The device or TSP detects an impact by analyzing the acceleration/g-force on all three axes on the vehicle and if the acceleration goes above a specified threshold then an impact event is recorded. The acceleration data is also recorded before and after the impact so that it can be displayed for analysis. This data can be used to determine the direction and magnitude of the impact.

At step 909, the TSP does not send an update to close the contract immediately as the vehicle may not actually be returned. That is, the vehicle could just have entered the geofence of a station id without any intention to return the car. For example, the vehicle may have returned to the station S1 to report an issue that can be resolved without the need to check the vehicle in and provide a replacement vehicle. It may be coincidently parked close to or outside a different return station for short period of time.

A new contract is subsequently opened for vehicle L1—step 910. It will be appreciated that the vehicle L1 could be assigned to some other task not corresponding to the opening of a rental contract at step 910. For example, an electronic record could be opened for the vehicle assigning it to the task of maintenance, repair, cleaning etc.

The RLS informs the TSP of the new contract C2 at step 911 and contract detailed are also provided. At step 912, the TSP sends a message to the RLS to close contract C1. This message is sent along with the total mileage for the previous rental (of contract C1), the time the vehicle was returned and the return location. If the return time is not before the expected return time and the location is not correct the renter/driver may be charged an additional fee by the RLS.

The mileage which is automatically recorded at check-in or during a rental/NRM period by the OBU can be used to trigger buy back alerts. Vehicles that are purchased by a rental or leasing companies are often bought under the agreement that the vehicle will be "bought back" by the dealership when the vehicle is under a certain mileage or before a certain date. If either the mileage or date threshold is exceeded the dealership will charge a penalty. The TSP can use the mileage recorded by the OBU during check-in or during the course of a rental contract or NRM movement to trigger buyback alerts. These alerts can be configured to be triggered at certain thresholds of the buyback mileage (e.g. 80%, 90%) which can notify a fleet or branch manager to take action to return the vehicle to the dealership.

In some circumstance, a new contract is not opened for the vehicle L1 (the vehicle is not assigned a different task) although it physically returned to a station. At step 913, the TSP periodically checks if the vehicle has left station S2—the return station in this case.

If the new contract C2 was not opened (steps 910-912 do not occur) after vehicle returned to S2 and the vehicle L1 leaves the return station S2 then the contract C1 will not be closed—step 914. In this scenario, although a vehicle entered the geofence of a return station (S2), the intention was not to check the vehicle in (return the vehicle and close the contract). Therefore, the contract is not closed.

If a new contract C2 is not opened (steps 910-912 do not occur) and vehicle L1 does not leave the return station S2 after a certain period of time then the TSP determines that the contract C1 should be closed i.e., the vehicle should be deemed checked in. The TSP sends a message to close the contract C2 with the mileage, return location and date/time—step 915. In this case, the vehicle has been returned and left to sit at the return station S2 for a period of time such that it is clear that it is not longer being rented and should be checked in i.e., assigned a different task such as "not on rent", "being cleaned" etc.

An addition step can be added to automatically record whether the vehicle fuel tank is full or not full. Under current practice, the fuel is manually checked by the check-in agent by viewing the vehicle dashboard reading. However, they can often misread the fuel gauge and the renter is undercharged or overcharged. Typically the renter should be charged for fuel if they did not bring the vehicle back full unless they pre-paid for the fuel. Using a telematics device, the fuel reading can be measured automatically by connecting to the Onboard Board Diagnostic(OBD) port or the CAN bus of the vehicle. This allows the OBU to read the fuel level directly from the vehicle's on-board computer. However, the types of devices that read from the onboard computer are not suitable for a rental fleet or any fleet that has a high turnover of vehicles since they take too long to install and uninstall.

A new method is required for "fast install" devices that are not connected to vehicle's on-board computer. One such method is to obtain a list of the geofences coordinates for every fuel station in the country the rental company is located in. This list can be obtained by manually creating it from observation, obtaining from a third party or using a learning algorithm to generate it. Fuel stations can be identified by evaluating patterns in the OBU and rental system data. For example, the TSP can assess all the locations that renters frequently stop at before returning to a branch and assess how long they stay there. Once the TSP has a list of locations it can determine the number of times renters go to these locations and subsequently did not pay for fuel. If there is a high correlation, then it is likely to be a fuel station. Fuel stations can be added or removed from the list based on the number of correlations over a given time period.

Once the TSP has the geofences for every fuel station, then it can record every time a renter's vehicle crosses a fuel station geofence in the rental record for that renter. Then at check-in time, the TSP calculates the distance travelled since the time of the last fuel station crossing. If the distance is above a certain threshold, it notifies the check-in to charge the customer for fuel. This notification should decrease the number of instances of lost fuel revenue.

The TSP can further improve the estimation of fuel level by basing it on the total mileage since the last fuel station, the vehicle details (model, type and year) and the driving behavior of the driver during the time period since the fuel station visit and the entry to the check-in geofence. The vehicle manufacturers specification of the number of Miles Per Gallon (MPG) of each vehicle can be used to calculate the estimated fuel consumption of the vehicle combined with the average speed and acceleration events during the journeys since the last fuelling.

A periodic report can also be run to identify lost fuel revenue for each branch retrospectively using the same logic. This report will identify all the renters that returned the vehicle that exceeded a certain distance after their last fuel station visit that subsequently did not pay for fuel at check-in (i.e. a fuel charge anomaly). This logic has a limitation that it can only determine if the vehicle did not return full but is unable to determine if the vehicle returned full. For example, if a renter returned a vehicle that travelled 5KM after it visited the last fuel station it is impossible to assert that the vehicle is full. The renter may have just stopped at a fuel station but did not fill up (e.g. they got coffee, food etc.). However, if a renter returned a vehicle that travelled 1 OOKM after the last fuel station then it can be asserted that the vehicle is not full. Consequently, this method can correctly identify fuel charge anomalies but may miss a small percentage of fuel charge anomalies where renters stopped in petrol stations nearby but did not fill up. However, it has been shown in the field to correctly identify enough fuel charge anomalies to yield significant fuel savings.

The above embodiment is clearly advantageous as it removes potential human error with respect to checking in a vehicle that has returned to a rental station. It is also more efficient and time saving as a user does not have to manually check in vehicles as they are returned to a station. For example, a user is aware that if a vehicle (or plurality of vehicles) is returned to a station just before closing, the vehicle can simply be left at the station over night and by morning, the RLS will have recorded the vehicle as checked in.

Another embodiment of the teachings in accordance with the present 25 disclosures involves correlating data from a fleet management system (such as a rental system) with telematics data to detect and resolve erroneous contract inputs.

When a vehicle goes out on rent or is involved in a NRM or assigned to any task, a user of the vehicle management system is required to fill out details of this movement. This includes entering the details of the driver/customer, vehicle and locations. Often users can input the incorrect details for a vehicle, driver/customer or location. This can result in system having the incorrect location for a vehicle and consequently it could lead to users of the vehicle management system spending needless hours trying to identify the correct location for a vehicle. The system and method outlined in accordance with this embodiment of the present teachings automatically identifies and resolves these issues.

A method for resolving errors in records of a vehicle management system in accordance with the present teachings may comprise the steps of receiving vehicle information from a fleet management system, the information identifying that a first vehicle has been assigned to a task, receiving time and location data of the first vehicle from an on-board telematics unit, receiving time and location data of a second vehicle from an on-board telematics unit, assigning the second vehicle to the task if it is determined that the first vehicle has not moved for a predetermined period of time. The method may further comprise assigning the second vehicle to the task if it is determined that the second vehicle has moved within a predetermined period of time.

Figure 10:
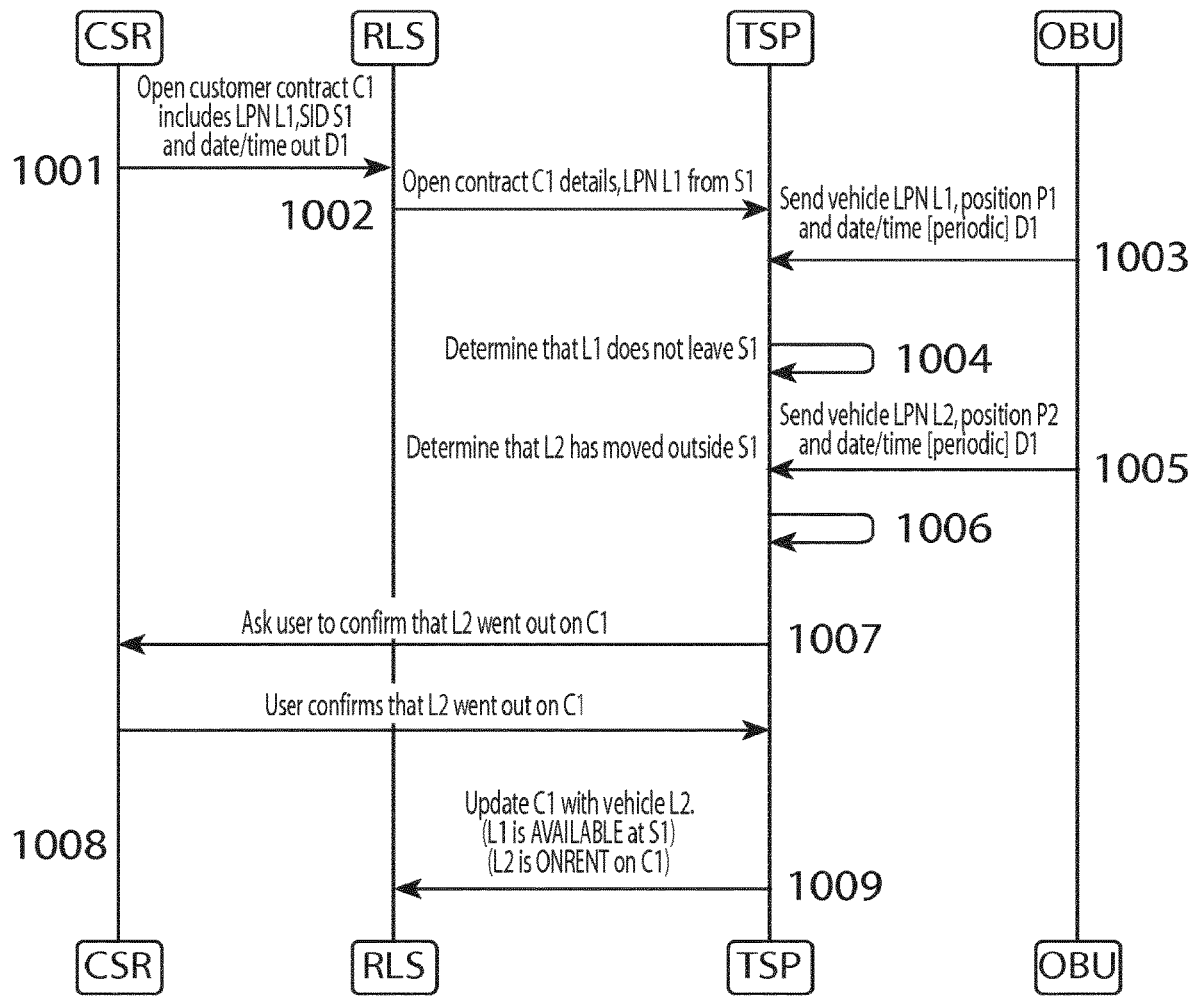
FIG. 10 is also a flow diagram for a method of detecting and resolving errors in vehicle records at a fleet management system in accordance with the present teachings.

The sequence diagram of FIG. 10 shows an exemplary work flow for detecting and resolving errors in contracts at a rental system. The skilled person will be aware that this method is equally applicable to any fleet management system. That is, errors in records assigning vehicle to tasks may be corrected using the method outlined herein.

At step 1001, a system user opens a contract for a vehicle L1. At step 1002, the contract details are provided to the telematics system. The vehicle L1 position, time etc. are periodically provided to the telematics system by the OBU of the vehicle for which a contract has been opened—steps 1003. At step 1004, it is determined based on the data received from the OBU that the vehicle L1 has not left station S1 where the contract was opened. The TSP also periodically receives information from an OBU of another vehicle L2—step 1005. At step 1006, it is determined based on data received from the OBU of vehicle L2 that vehicle L2 has moved outside the geofence of station S1.

At step 1009, the TSP makes a request to the RLS to update its contract data. It automatically detected that it was probable that L2 went out on contract C1 as it left the geofence at a time closer to the time that that the contract opened. In this flow, the TSP asks the user whether its suggested update is correct step 1007. The user confirmation the L2 should be associated with contract C1. An alternative flow could make the update without steps 1007 and 1008. The closer to the time that L2 leaves the geofence S1 after C1 is opened and the longer L1 leaves after the contract C1 is opened, the higher the confidence that L2 is the correct vehicle. This same procedure is relevant for NRM movements as well.

As in known in the art, a vehicle must go through several stages of a vehicle delivery pipeline before it is available to rent again or available to be assigned to another task. After a vehicle is returned to a rental station/depot, the vehicle must first be evaluated for damage and the mileage is checked. This check is performed while the vehicle is in the return bay. Once this check has been completed, the vehicle is ready to be moved to the fuelling bay where it is fuelled and then to the cleaning bay where the vehicle is queued for cleaning. Once cleaned the vehicle is finally moved to the ready bays, at which point it can be put out on rent again. This is merely one example of a vehicle delivery pipeline employed by a fleet management system.

It is important for an administrator to have a real-time view of the status of each vehicle in a branch/station to maximize employee efficiency, customer satisfaction and revenue. Often when a customer arrives to pick up their vehicle there is no vehicle of that type available and they either have to make the customer wait or give them a free upgrade to a vehicle that is ready. The former results in poor customer experience and the latter results in lost revenue as this vehicle could have been rented at a higher price. Having a real-time view of where each vehicle is in the pipeline and analyzing the data to predict the supply and demand of each vehicle type is key to maximizing the pipeline efficiency and reducing cost.

Figure 11:
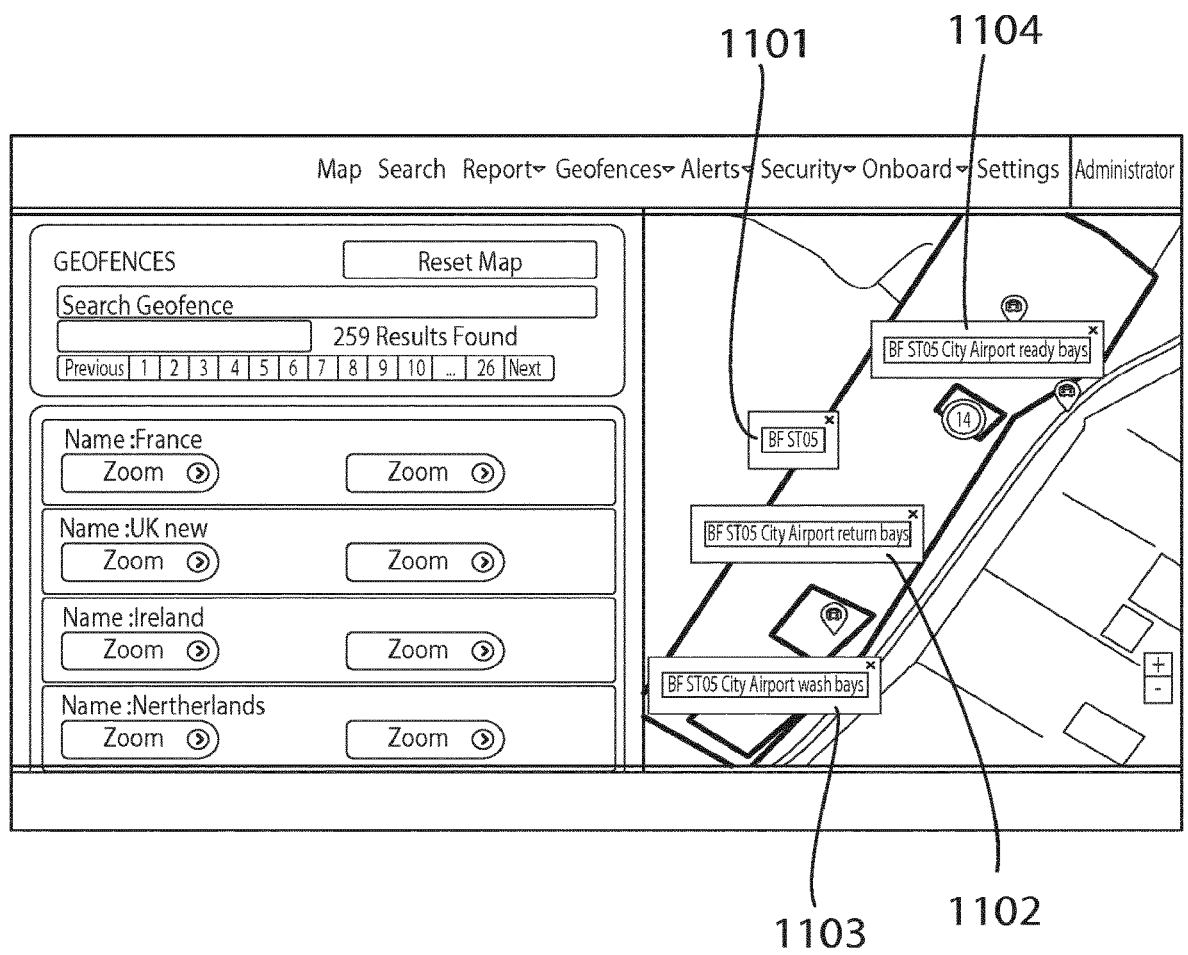
FIG. 11 is a graphical user interface showing a geofence and sub-geofences for a location in accordance with the present teachings.

With reference to FIG. 11, this shows a graphical user interface in accordance with the present teachings. In particular, an aerial view of a rental branch BFSTO5 geofence is shown with three sub geofences.

BFST05—1101 in FIG. 11
    This is the main geofence which surrounds the branch or station. All vehicles that are currently in the branch are within this geofence. This geofence surrounds all the other geofences below.

BFST05 City Airport Return Bays—1102 in FIG. 11
    This geofence shows all vehicles that have just been returned from rentals.

BFST05 City Airport Cleaning Bays—1103 in FIG. 11
    This geofence shows all vehicles that are in the process of being cleaned.

BFST05 City Airport Ready Bays—1104 in FIG. 11
    This geofence shows all the vehicles that have been cleaned and are available and ready to rent.

Having real-time visibility of the location of each vehicle in the branch BFST05, gives the branch managers/administrators the ability to make better decisions with respect to fleet management. The real-time visibility shown in FIG. 11 can be used in conjunction with the supply and demand data for each vehicle type to manage the fleet in a more optimal way. This will improve the fleet administrator's ability to ensure the supply of each vehicle type is available at the time in which there is a demand for it.

To demonstrate the difficulty in managing the fleet pipeline consider a fleet with just two vehicle types. Table 2 below shows conventionally calculated projections for the net numbers for two vehicle categories (Compact vs Intermediate) in a single branch. In table 2, the COMO and IOMO refer to the ACRISS (Association of Car Rental Industry Systems Standards) car classification code for a type of compact vehicle and a type of intermediate vehicle respectively. These projections are calculated by determining how many vehicles that are on rent will be returning at each hour of a day versus how many reservations there are for that vehicle in the same hour.

TABLE 2

| IDMD Net Projections (Intermediate) | | | | | | | |
|---|---|---|---|---|---|---|---|
| TIME (AM) | 5 | 6 | 7 | 8 | 9 | 10 | 11 | 12 |
| INCOMING | | 7 | 4 | 2 | 5 | 7 | 5 | 3 |
| OUTGOING | | 8 | 4 | 4 | 5 | 6 | 6 | 6 |
| NET | 10 | 9 | 9 | 7 | 7 | 8 | 7 | 4 |

| CDMD Net Projections (Compact) | | | | | | | |
|---|---|---|---|---|---|---|---|
| TIME (AM) | 5 | 6 | 7 | 8 | 9 | 10 | 11 | 12 |
| INCOMING | | 4 | 6 | 3 | 3 | 3 | 5 | 3 |
| OUTGOING | | 8 | 6 | 5 | 4 | 4 | 5 | 6 |
| NET | 10 | 6 | 6 | 4 | 3 | 2 | 2 | −1 |

| Time | IDMD | CDMD |
|---|---|---|
| 5 | 10 | 10 |
| 6 | 9 | 6 |
| 7 | 9 | 6 |
| 8 | 7 | 4 |
| 9 | 7 | 3 |
| 10 | 8 | 2 |
| 11 | 7 | 2 |
| 12 | 4 | −1 |

At the beginning of the day (5 am in Table 2), a member of staff performs a stock check to see how many vehicles are currently at the branch and determines that there are 10 COMO and 10 IOMO vehicles. According to these projections, the IOMO class of vehicle will have 8 outgoing rentals between 5 am-6 am and 7 vehicles are due to return so the net number at 6 am is 9 for intermediate vehicles. The COMO vehicle is expected to have 4 vehicles due back and 8 vehicles outgoing during this same period. Therefore at 6 am, there is expected to be 6 COMO vehicles available. By 12 am, it is estimated that the COMO class of vehicle will be in deficit (−1) and the IDMD class of vehicle will be in a surplus (+4) based on these projections.

Using static projections like the ones shown in Table 2 above can lead to poor management of the vehicle delivery pipeline. It is difficult to predict whether customers will return vehicles on time and whether customers will turn up for their reservations on time. Furthermore, new rentals get added to the system on an ongoing basis and it's also unpredictable whether customers will show up without reservations looking to rent a vehicle. Consequently, the nature of a rental fleet is very dynamic and very difficult to project.

For example, based on the projections of Table 2, customer service representatives at a branch might be given instructions at the beginning of the day to upgrade customers from compact to intermediate at a highly discounted rate. In addition, to compensate for the shortage of compact vehicles the return agents may be requested to move compact vehicles from an overflow car park to the branch or to fast track compact vehicles through the cleaning bays. If the projections are correct and employees successfully carry out these instructions and manage to upgrade two compacts to intermediate by 12 am there will be surplus of both vehicles (compacts +1 and intermediate +2).

However, if these projections turn out to be incorrect then these instructions can add to the problem rather than providing the solution. Table 3 below, gives the actual data for the net number of vehicles by type on the same day. Due to a variety of circumstance the graphs have flipped and the intermediate is now in a deficit (−1) and the compact is in a surplus (+2). These circumstances could include customers turning up late/early, customers not turning up at all, or customers returning vehicles late/early. Therefore, the decisions made at the beginning of day based on the projections in Table 2 have compounded an already bad situation. In this case, customers that have hired intermediate vehicles will have a poor customer experience as they must wait around until vehicles are returned or alternatively the customer service representative will have to give them free upgrades to more expensive vehicles. Either circumstance is undesirable for the rental company.

TABLE 3

| Actual IDMD Net Data (Intermediate) | | | | | | | |
|---|---|---|---|---|---|---|---|
| TIME (AM) | 5 | 6 | 7 | 8 | 9 | 10 | 11 | 12 |
| INCOMING | | 4 | 5 | 1 | 4 | 5 | 6 | 2 |
| OUTGOING | | 8 | 4 | 4 | 5 | 5 | 7 | 5 |
| NET | 10 | 6 | 7 | 4 | 3 | 3 | 2 | −1 |

| Actual CDMD Net Data (Compact) | | | | | | | |
|---|---|---|---|---|---|---|---|
| TIME (AM) | 5 | 6 | 7 | 8 | 9 | 10 | 11 | 12 |
| INCOMING | | 5 | 4 | 5 | 3 | 5 | 6 | 2 |
| OUTGOING | | 8 | 4 | 5 | 5 | 6 | 4 | 6 |
| NET | 10 | 7 | 7 | 7 | 5 | 4 | 6 | 2 |

TABLE 3-continued

| Time | IDMD | CDMD |
| --- | --- | --- |
| 5 | 10 | 10 |
| 6 | 6 | 7 |
| 7 | 4 | 7 |
| 8 | 4 | 7 |
| 9 | 3 | 5 |
| 10 | 3 | 4 |
| 11 | 2 | 6 |
| 12 | −1 | 2 |

The status of a rental fleet is highly dynamic and is always changing which makes it very difficult to make well informed decisions and make accurate projections based on static data. However, by combining a live feed of the telematics and fleet management data, fleet managers can have a more real-time view of their fleet allowing them to make faster and better decisions at every moment.

Figure 12:
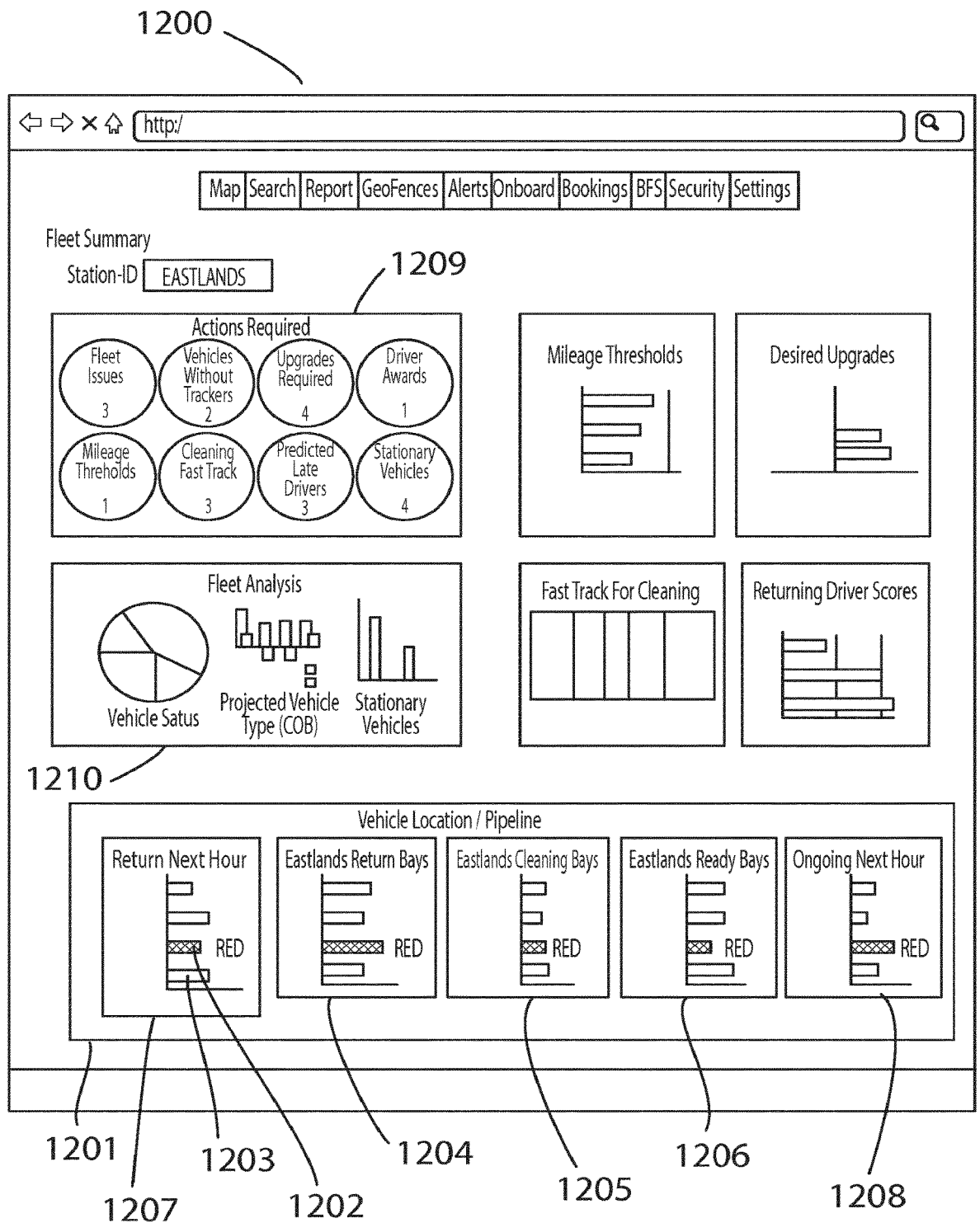
FIG. 12 is a graphical user interface in accordance with the present teachings that gives a real-time converged view of telematics data and fleet management data.

Turning to FIG. 12, this shows a graphical user interface 1200 in accordance with the present teachings that gives a real-time converged view of the telematics and rental data. At 1201, the real-time vehicle pipeline and predicted projections for the number of vehicles returning and due out in the next hour is shown. The pipeline time frame can be changed to give longer projections (e.g. next two hours, next 10 twelve hours etc.).

The system is also able to make real-time projections whether there will be deficit or surplus of any vehicle type. If a vehicle type is predicted to be in deficit in the next hour then the pipeline bar for this vehicle is highlighted e.g. turns red. In FIG. 12, vehicle type IDMD is labeled as red at 1202. Otherwise if a vehicle is in surplus the graphical status is shown accordingly, For example, vehicle type IFMD may be labeled or shown in blue at 1203.

The values in pipeline bars are calculated by combining rental data from the rental system and telematics data from the on board units. Based on the position of the vehicle the TSP can calculate whether the vehicle is in one of three stages of the pipeline:

Returned—1204
Cleaning—1205
Ready—1206

Initially when the system is setup the user of the telematics system creates geofences for each branch indicating the location of the cleaning bays, returns bays and available bays or any other location-based process (e.g. fuelling). These geofences may be sub-geofences for the geofence of the branch/station. These geofences can also be created automatically as previously described above. If a branch has no allocated available bays or return bays then these can be omitted i.e., geofences do not have to be created for these.

Every time an OBU sends its position, the TSP calculates whether the position of the corresponding/associated vehicle falls inside one of these geofences. If so it increases the value of that vehicle type i.e., records another instance of the vehicle type at that location.

Once the TSP determines the sub-geofence that each vehicle is in within the branch, it can combine this data with contextual data from the rental system data and the OBU to determine the times that each sub-process takes(e.g. checking bay, cleaning bay etc.). For example, the following steps can be taken by the TSP to calculate the check-in time for a specific vehicle. Store the time that a vehicle crosses the check-in or branch geofence. When the rental system sends an event to the TSP notifying it that the contract is closed and the vehicle is checked in then calculate the difference in time between the contract being closed and the time the vehicle entered the check-in geofence. Similarly, when a vehicle crosses the cleaning bay geofence, the TSP can get further context by first ensuring that the vehicle stops in the cleaning bay. If it drives straight through, then this is not considered a valid cleaning time. Furthermore, it can check the status of the vehicle to see whether it has recently come back from a rental and has been checked-in. Also, the TSP should consider the accuracy of each position point sent by the vehicles OBUS when calculating the cleaning bay time.

Cleaning bays are often in a sheltered location that may obstruct the GPS signal. This obstruction of the GPS signal has an impact the accuracy of the metric calculation. Each data point sent by the OBU is accompanied with loggong data that specifies the accuracy of that data point. This logging data includes the number of satellites that the data point was based on and its dilution of precision. By removing any data points that have a low precision you can increase the accuracy of your cleaning time metrics when the signal is obstructed for a period of time during the process. To further increase accuracy of these metrics, the OBUs can be configured to dynamically increase the number of positions sent while the vehicle is travelling around the branch geofence. This will increase the number of position and time stamp samples sent which allows for more fine-grained calculation of these metrics. This is not just applicable to calculating the branch performance metrics. The reporting rate can be configured dynamically based on the level of precision required to calculate a metric in any geofence. For example, if you are trying to calculate how safe a driver is driving based on their acceleration/deceleration metrics then you may decrease the reporting rate based on how likely the driver is to change speeds. For example, if they are on a motorway it may be decreased to every 15 seconds and when they in the city center it increased to every 1 second. This allows the TSP to decrease their networking costs while minimising the trade-off the reduce reporting rate has on the accuracy of the key metric calculations.

Another key performance metric that can be calculated using a combination of the OBU and rental system data is the customers arrive to drive (A2D) time. This is the time in between the customer signing up their contract at the desk until they leave the branch with the rented vehicle. This metric is an indication of the customers experience. Often there will be a correlation between the average customer's A2D time for a given time period with another key metric called the average return-to-ready time (R2R). The average R2R time is the average time it takes to get a vehicle ready to rent again after it has been returned from a rental. This is calculated by adding each of the sub-processes at a branch which may include all or a subset of the following:— checking-in, cleaning, fuelling times and parking the vehicle in available bays. The average turnaround time is another key metric that a branch aims to minimise. This is the average time between a vehicle returning from one rental and going out on another rental. This metric combines the R2R time and the time that a vehicle is sitting around idle after it is ready before it goes out on rent again. The turnaround time is calculated by determining the time between when a vehicle enters and then exits the branch geofence. This time is used alongside checking the rental system data to make sure that a vehicle returned from one rental, was check-in and went out on another rental. By the TSP measuring the turnaround time and giving a breakdown of where the vehicle's time is spent during this process, a branch can take actions to reduce the operational slack of its fleet and increase its fleet utilization which results increased revenue or reduced fleet sizes.

The TSP can use the above calculations of time and throughput of each subprocess to measure the speed and efficiency of the branch. By displaying these metrics to a branch, fleet or operations manager, they can use this information to identify any efficiencies or bottlenecks in the process. In addition, the TSP can combine this data with the actions users take at any given time (i.e. create a feedback loop) to learn the optimal way to run a branch.

These calculations can also be used to measure the performance of each branch and compare branches with each other. Each branch can be given a set of KPI targets to meet each week based on each one of these metrics and a score can be given based on how often these metrics are met on an hourly basis. Each week, the branches are given a score and a breakdown of how they performed in respect of each metric. By providing this visibility to each branch, they are given ongoing feedback on their performance and any improvements they have made which will drive improved performance and increased gamification between branches. This real-time and historical data along with the estimated incoming and outgoing vehicles can also be used by the branch managers to determine the best decision to make at any time to optimize the branch processes.

The estimated incoming and outgoing vehicle metrics in the next hour are predicated by the TSP by combining the telematics and rental data:

Return next hour—1207

Outgoing next hour—1208

The "Return next hour" values are calculated by taking the due back times specified by the rental system and combining this with the actual geographic location of these vehicle (using data from the OBUs) and determining the likelihood that it will return in the next hour. For example, if a vehicle is due back in 30 mins but the vehicle is two hours drive time from the return location then this will be omitted from the "Return next hour" category 1207. A higher level of analysis can be used that takes into account the rate at which the vehicle has moved towards the branch. For example, application programming interfaces (e.g. Google APIs) could be used to calculate the expected arrival time. Any similar system may also be used in place of Google APIs. This is based on start and end location and takes into account current and historical traffic. However, Google does not take into account, whether the driver knows their way back or whether the driver intends on returning the vehicle or whether the driver is currently stopped (for lunch for example). If the vehicle is within a 1 hour ETA but has not moved in the general direction of the branch in the last X minutes then it will be removed from the list of expected vehicle returns. These calculations are merely exemplary and any specific criteria can be chosen by the person skilled in the art.

The "Outgoing next hour" values 1208 are calculated by adding the number of reservations of each vehicle type due out in the next hour as specified by the rental system and the number of vehicles that were due out earlier in the day but the customers have not arrived yet (i.e. late arrivals). Using this calculation will result in decisions being made that will ensure that if all the late customers and on time customer were to arrive in the next hour then there will be enough vehicles of the correct types for all those customers. Obviously if a customer has cancelled their reservation then this reservation will not be included in the calculation of the projected value.

The pipeline bar for a vehicle is highlighted (e.g., turns red) if the number of vehicles in the ready bay 1206 is not sufficient to supply the demand in the next hour. If this is the case, actions can be taken to fast track vehicles of that type through the cleaning bay 1205. This drives the "Cleaning FastTrack" part of the "Actions Required" 1209 and the "Fast Track For Cleaning" portions of the graphical user interface is shown in FIG. 12. If the supply of a vehicle type in the ready bays does not meet the demand in the next hour then returning vehicles in the next hour and the vehicles in the return bays of that type will be fast tracked through to the cleaning bay in order to increase the supply of this vehicle type to provide for the projected demand. The estimated return time, drives the "Predicted Late Drivers" action which gives the customer service representative an action to contact the driver to make them aware that they are due back and to get an updated return time.

At 1210 in FIG. 12 is "Fleet Analysis" breakdown. This shows the status of all the vehicles related to the station (in this case Eastlands station). The statuses shown are ON RENT, FOR SALE, AVAILABLE and NRM. It will be appreciated that these are merely exemplary and any number of different statuses may be provided.

"Projected Vehicle Type (COB)" is also shown as part of the fleet analysis 1201. This provides projections of the net values of each vehicle type by the close of business that day. This is calculated by determining the total number of available vehicles of each type in a station right now. This may be done using the method for automated stock reporting previously described herein. The total number is then added to the total number of vehicles left to return today and taking away the total number of vehicles left to go out on rent. This graph is constantly updated based on the number vehicles in the branch location and rental and reservation updates from the rental system. These calculations drive the "Upgrades Required" part of the "Actions Required" 1209 and "Desired Upgrades" part shown in the graphical user interface of FIG. 12. All customer service representatives are required to attempt to upgrade drivers to ensure there are no deficits at any time of the day. The calculations in this instance are predicting there will be a deficit of ECMR (−2) and COMO (−2) vehicles by the end of the day. Therefore, the CSR will be instructed to take actions to upgrade customers that have reservations of these vehicle types to vehicles types that are in surplus. In this case the calculations predict by close of business that IDMD (+4) and IFMD (+5) vehicle types will be both be in a surplus. Consequently the "Desired Upgrades" portion of the graphical user interface 1200 is instructing that they upgrade from ECMR and COMO to IDMD and IFMD. However, IDMD upgrades are temporarily on hold due to this vehicle type being currently in a deficit which is calculated using the pipeline.

Figure 13:
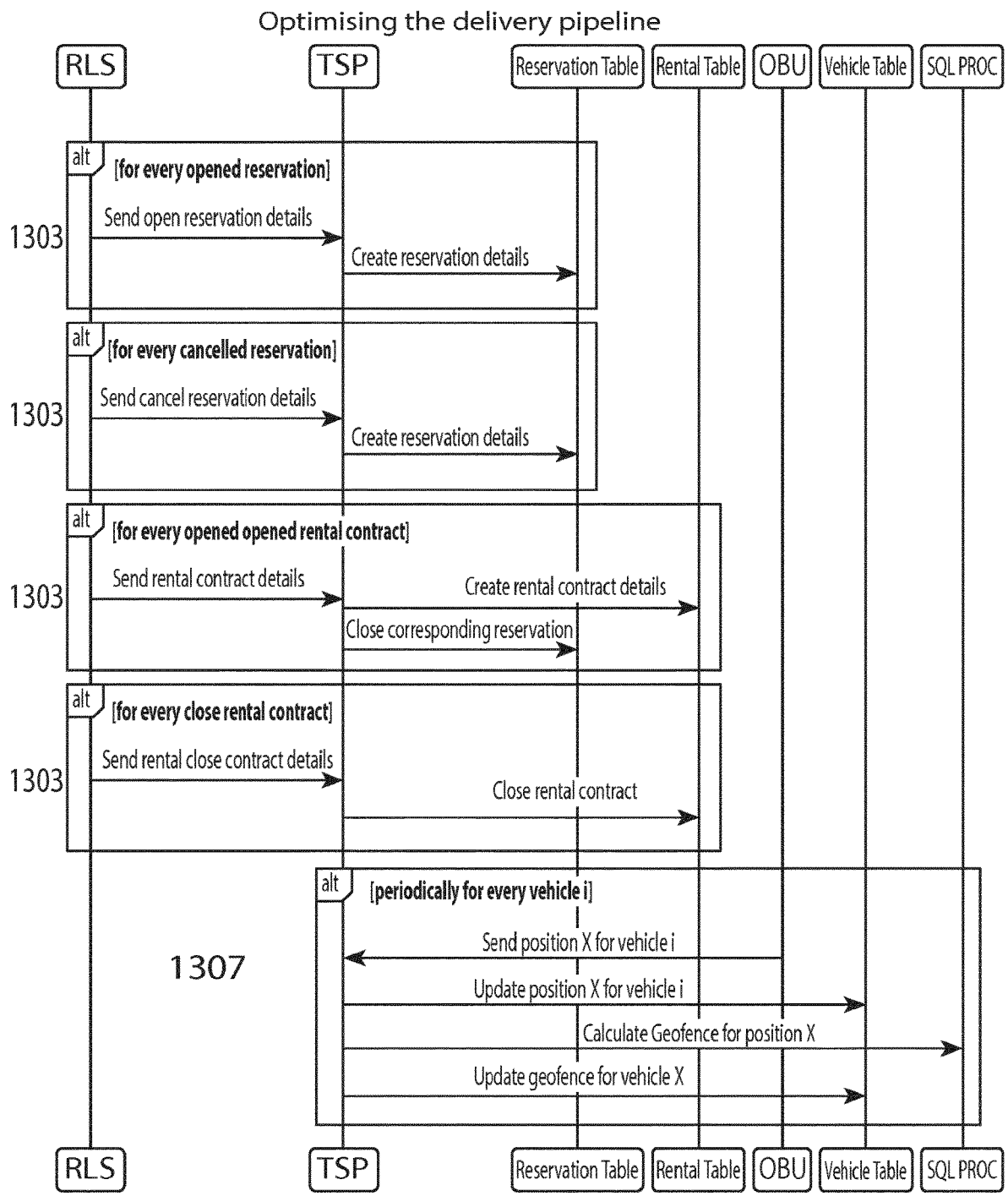
FIG. 13 is a flow diagram for a method of generating a vehicle pipeline report in accordance with the present teachings.
Figure 14:
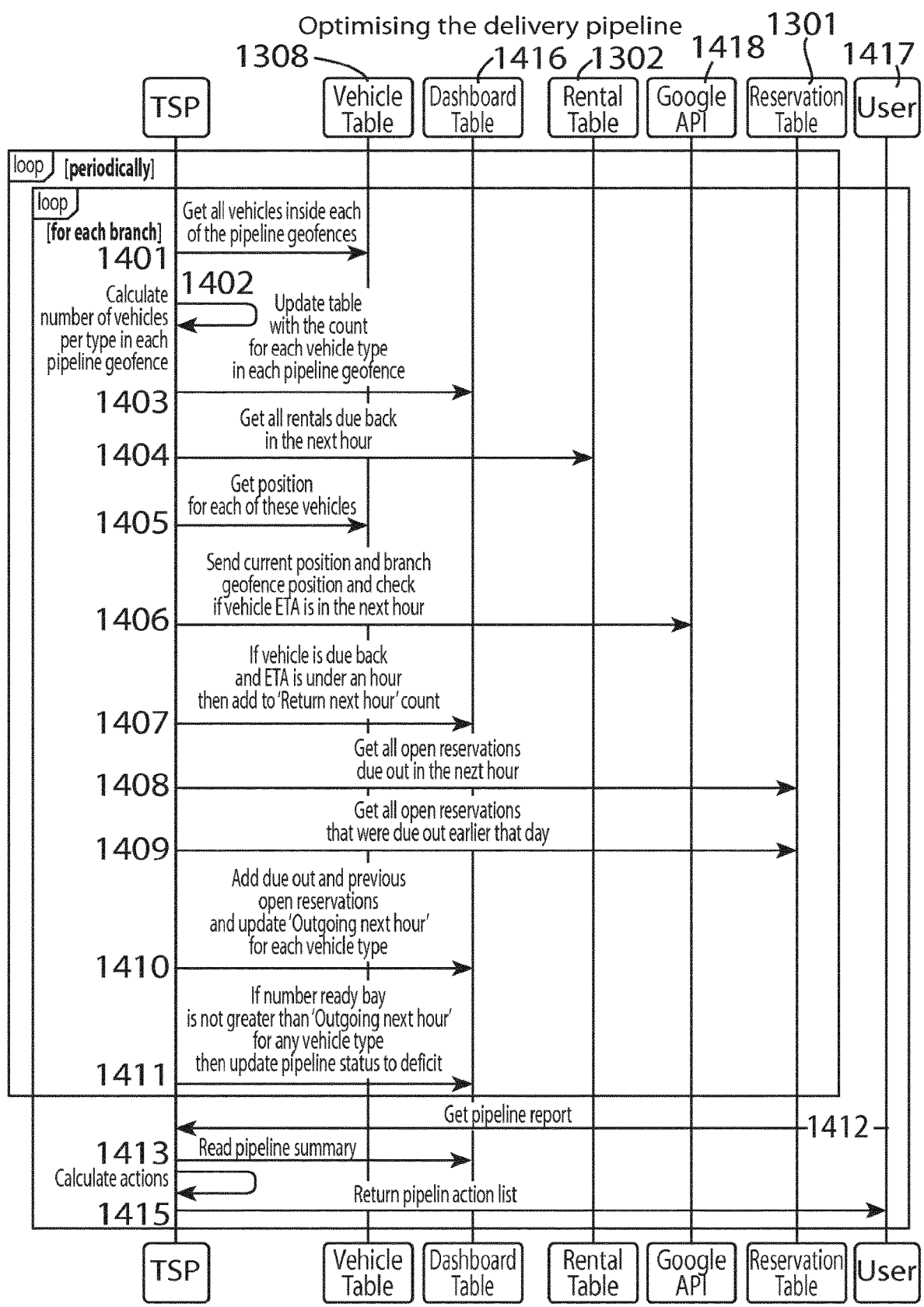
FIG. 14 is also a flow diagram for a method of generating a vehicle pipeline report in accordance with the present teachings.

FIGS. 13 and 14 are sequence diagrams showing the process for generating reports for determining the current vehicle pipeline and determining current and predicted future supply and demands for each vehicle type. The analysis of this data will allow to TSP to provide real time actions to take for each employee or user to improve optimize customer satisfaction and increase revenue.

FIG. 13 shows how a plurality of tables used to generate the report are populated. The rental system RLS sends to the telematics system TSP details for reservations and rental contracts in real time every time a reservation or rental contract is opened or closed—steps 1303-1306. The TSP respectively populates an electronic record —"Reservation Table" 1301 and "Rental Table" 1302 with these details. The "Reservation Table" 1301 is used by the TSP to determine future demand for vehicle types and "Rental Table" 1302 is used to determine which vehicles are out on rent and which ones are available for rent. When this information is correlated with the telematics data from OBUs it can used to determine the current supply of vehicles of each type as outlined in more detail below.

At 1307 of FIG. 13, the OBUs send updates for each vehicle position. Periodically the TSP uses an SQL PROC to determine if this position falls inside any of the preconfigured geofences. The TSP uses this data to determine whether the vehicle is located within one of the pipeline geofence in any of the rental stations. These pipeline geofences may include the "Return Bays" 1102, "Cleaning Bays" 1103 and the "Available Bays" 1104 previously described. This data allows the TSP to determine which vehicles are available in the branch (i.e. current supply) and which vehicles will be available soon at the branch (i.e. future supply). This can be calculated based on their current position in the pipeline (i.e. their current geofence). The vehicle table 1308 is updated based on the results of the SQL PROC accordingly.

It will be appreciated that the objective of the procedure of FIG. 13 is simply to populate electronic records (reservation table 1301, rental table 1302 and vehicle table 1308) by the TSP with up to date information that can be used to determine vehicle availability. The procedure to determine vehicle availability will be outlined in more detail below. Specifically, FIG. 14 outlines how the information in the tables of FIG. 13 are used to determine vehicle availability.

The sequence diagram of FIG. 14 shows the TSP determining the count for each vehicle type at each stage in the pipeline. This is then used to calculate the current supply and demand and project future supply and demand in each station id (branch).

Periodically for each branch, the TSP retrieves the position of each vehicle at the branch/station and determines if it is in a pipeline geofence—step 1401. This involves retrieving information from the previously described vehicle table 1308, which maintains a location record of all vehicles at a station. That is, it maintains a record of all vehicles within a global geofence of the station (BFST05 1101 in FIG. 11) as well as sub-geofences or pipeline geofences. By retrieving the information from the vehicle table 1308, it is determined if a vehicle is within one of the pipeline geofences such as "Return Bays" 1102, "Cleaning Bays" 1103 and the "Available Bays" 1104 etc. If a vehicle is inside a pipeline geofence, the TSP checks the status and if the status of the vehicle is recorded as "AVAILABLE" it increases the count for that vehicle type for that stage in the pipeline (e.g. it increases count for" "Return Bays" 1102, "Cleaning Bays" 1103 and the "Available Bays" 1104)— step 1402. If the vehicle does not have a status "AVAILABLE" (i.e. "NRM", "ONRENT", "FORSALE", "SOLD") then the vehicle will not be added to this count so will not be included in current or future projections of supply for that vehicle type (supply of vehicles for rent). Step 1403 may include updating a vehicle dashboard 1416 similar to that shown in FIG. 12. This step may simply involve updating an electronic record 1416 with the information—count for each vehicle. That is, after information has been collated in steps 1401 and 1402, the number of vehicles of each type inside each subgeofence or pipeline geofence of the station is recorded.

Next, at step 1404, the TSP retrieves rental contract information from the previously described "Rental Table" 1302 with respect to vehicles that are due back in the next hour to determine future availability for each vehicle type. It will be appreciated that any time window can be used in place of one hour. The TSP correlates this data with the telematics data to gain a higher confidence in the return times i.e., to determine if the vehicle(s) will return at the schedule return time. Then the TSP uses the telematics position data from the OBU which is stored in the "Vehicle Table" 1308 to determine if the vehicle will return within the schedule return time specified by the RLS. Specifically, at step 1405, the exact locations of the vehicles in question are retrieved from the vehicle table 1308.

Optionally, the position of the vehicle and return branch can be sent to a google map API 1418—step 1406. It will be appreciated that any alternative mapping API can be used for step 1406 e.g., Leaflet, Modest Maps, Polymaps.

Step 1406 is carried out to establish the estimated time of arrival (ETA) and whether the vehicle will return before its scheduled return time. This ETA may not be fully accurate if the driver has no intention of returning or if the driver is lost or driving away from the location or stopped for a long period of time. The TSP can use the position data points sent by the OBU to determine if the vehicle is moving towards the return station. If not, the vehicle will be removed from the list of vehicles due to return in the next hour. If it is determined that the ETA of the vehicle is less than one hour, the vehicle type will be counted in the vehicle pipeline due to return in the next hour—step 1407. That is, at step 1407, dashboard table 1416 is updated with vehicles due to return in the next hour.

To determine the demand for each vehicle type, the TSP reads the "Reservation Table" 1301 and gets a count for each vehicle due out in the next hour—1408. In addition, it reads the reservations that were due out earlier that day but a renter/driver has not collected the vehicle—step 1409. The reservations determined in step 1409 will be added to the total demand for each vehicle type to ensure that if all customers were to arrive in the next hour, vehicles would be available—step 1410. This is to ensure that the fleet is managed in such a way to provide supply if all late customers and current customers were to turn up in the next hour. Of course, the system may be adapted as appropriate wherein step 1409 does not occur or the system assumes that only 50% of late customers will come in the next hour or any other appropriate percentage.

At step 1411, it is determined whether the number of vehicles in the ready bay 1104 is greater than the number of outgoing vehicles in the next hour. If not, a deficit in the number of ready vehicles is noted. If the number is greater, a surplus is noted in the dashboard table 1416 at step 1411.

It should be appreciated that steps 1401 to 1411 can occur in a loop to ensure that the dashboard table 1416 is always up to date i.e., correctly indicated if there is a deficit or surplus of vehicle.

At any time, a user can request a report. For example at step 1412, a user 1417 requests a report for the branch. However, it should be appreciated that the report may be constantly available and displayed such as in FIG. 12. The step of 1412 may be performed periodically to update the report without user intervention.

At step 1413, the dashboard table 1416 is accessed to retrieve information. Based on the retrieved information, the report displays each vehicle type in to their current pipeline position. The report generation process can calculate the average time it takes to move a vehicle through the pipeline. For example, based on the position and movement of vehicles the TPS calculates how long it takes to check in a vehicle and then move a vehicle to the cleaning bay queue and then how long it takes to clean the vehicle and move it to the available bay.

Based on the combination of all of this information, the TSP can determine appropriate actions to be provided to the user 1417—step 1414. For example, the user 1417 can be given actions when a vehicle is returned and crosses the station's geofence to fast track this vehicle to the cleaning bay if it determines that this type of vehicle is short on supply. Similarly, it can instruct which vehicles the user 1417 (customer service representative) needs to assign to each contract based on their position in the pipeline. Furthermore, if the TSP determines there is a shortage of any vehicle type at any point, it can suggest to the user in real-time to recommend a discounted upgrade to the customer for a vehicle that it determines will be in a higher supply. The suggested actions and report are provided to user at step 1415.

This approach means that all decisions in regards to fleet management are directed by the TSP software including which vehicles are assigned to contracts, which vehicle are checked-in first and the order in which vehicles are cleaned. This system and method provides a better customer experience as it minimizes the times that customers have to wait for their vehicles and it improves employee experience as they have to spend less time dealing with unsatisfied customers.

This system and method describes a short-term pipeline which takes into account each "AVAILABLE" vehicle in the branch pipeline (returned, cleaning, ready) and vehicles due to return or vehicles due out in the next hour. It can be extended to take into consideration due out and due in vehicles in the next 2 hours or any suitable time window. It can be further improved by correlating telematics and RLS data over a longer period and employing machine learning and analyzing this data to determine trends and predict future supply and demands. These insights and suggested actions will give employees a more optimal set of real-time tasks that will improve their efficiency, increase customer satisfaction, and increase the overall revenue of the rental or leasing company.

The system and method above show how to calculate the key metrics to measure branch efficiency and performance to improve the decision making of users (fleet, operations and branch managers). Additionally,, a machine learning algorithm can be used to determine the optimal decision to make at any time by creating a feedback loop between user actions and branch performance metrics. All user actions are feed into the system either manually by the user through the rental system or TSP. A machine learning algorithm (e.g. a neural network) could determine the best action to take by each employee at any given time. It could do this by using all the historical actions taken by users, the state of the fleet according to the rental system, vehicle OBUs, and the calculated metrics described above as inputs to the algorithm. Then it would take all the resulting metrics from these inputs as the outputs to learn the optimal action to take at any time based on any new set of inputs (i.e. a combination of any new OBU data, rental system data, metrics and actions).

Another embodiment in accordance with the present teachings correlates data from a fleet management system with telematics data to provide location based advertising.

Currently advertising platforms like Google and Facebook base their advertising campaigns on user activity on their services. For example, Google can discover the characteristics and interests of users based on some of the following services:—

Google maps
  Web mapping service
Gmail
  Web based email
Google+
  Social networking platform
Android
  Mobile operating system From this data, Google can determine the user's age, address, interests and location. They then use this data to allow advertisers to provide more targeted advertising campaigns that can more precisely target their key demographic.

This embodiment of the present teachings combines fleet management data and telematics data to determine the characteristics and interests of drivers. Furthermore, this data may be leveraged or utilized to provide an advertising platform that can offer more targeted advertising campaigns.

Figure 15:
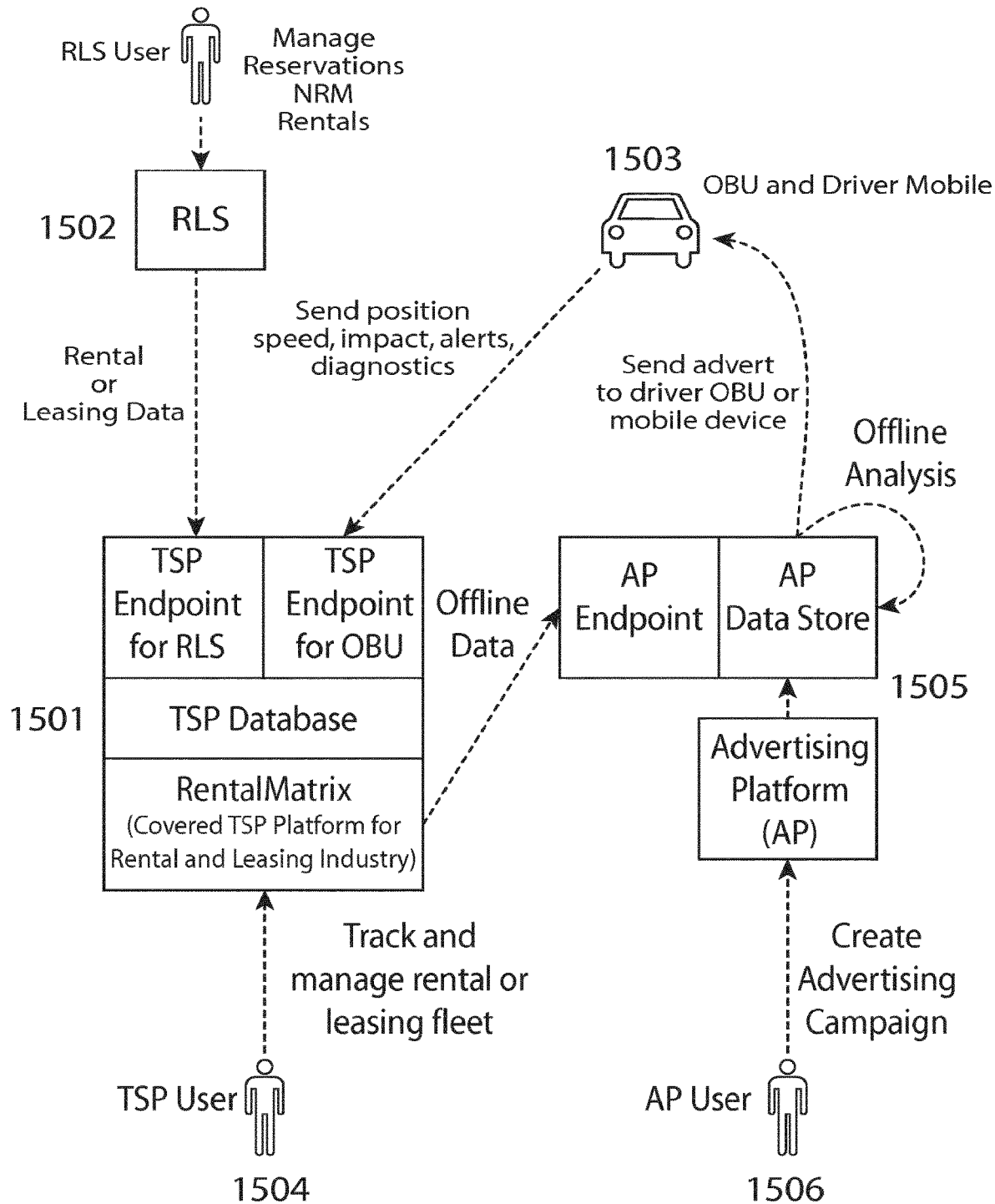
FIG. 15 is a block diagram of an advertising platform in accordance with the present teachings.

With reference to FIG. 15, this gives a high-level overview of the advertising system and method in accordance with the present embodiment of the invention. The TSP 1501 receives the rental/leasing data from the RLS 1502 and the telematics data from the OBU 1503. The TSP 1501 correlates this data to provide a platform for tracking and managing a fleet of rental and leasing vehicles. Specifically, this process correlates rentals and drivers/customers with telematics data Journeys, positions, impacts, driver safety scores). The TSP User 1504 is provided with a unified platform that provides key insights and actions for the fleet of vehicles in question. The correlated data is sent to an offline Advertising Platform (AP) DataStore 1505 via an AP Endpoint. The correlated telematics and rental/leasing data is analyzed to discover characteristics and interests of each driver.

An advertising platform user 1506 is able to create and target advertising campaigns based on the rental/leasing data, discovered interest/characteristics and the location of a driver.

Consider advertising decision table—Table 4—below that shows four advertising campaigns. This table outlines the criteria associated with each of the advertising campaigns.

Cheap beach hotel—1 week
Full Irish Breakfast Offer—Gerry's Coffee Shop
Golf Green Fees Offer—Lahinch Golf Club
Discount Concert Tickets—Aviva

TABLE 4

| Parameters | Ad #1 | Ad #2 | Ad #2 | Ad #4 |
| --- | --- | --- | --- | --- |
| Ad Description | Cheap beach hotel offer - 1 week | Full Irish Breakfast Offer - Gerry's Coffee Shop | Golf Green Fees Offer - Lahinch Gold Club | Discount concert tickets - Aviva |
| Current Geofences | Cork City, Middleton | Gerry's Coffee Shop Street | Lahinch | South Dublin |
| Frequently Visited Geofences | Cork City | ANY | ANY | ANY |
| Age Range | ANY | 50-70 | 20-40 | 20-30 |
| Sex | ANY | Male | Male | Female |
| Time of Day | ANY | Morning | ANY | Evening |

TABLE 4-continued

| Parameters | Ad #1 | Ad #2 | Ad #2 | Ad #4 |
| --- | --- | --- | --- | --- |
| Home Location | ANY | UK, Ireland | United States | Ireland |
| Due Out Location | Cork Airport | Dublin Airport | ANY | Dublin City |
| Due Back Location | Cork Airport | Dublin Airport | ANY | Dublin City |
| Length of hire | >7 days | ANY | >2 days | ANY |
| Remaining hire | >7 days | ANY | >2 days | ANY |
| Total Miles travelled on this trip | ANY | ANY | ANY | ANY |
| Total miles travelled on all trips | ANY | ANY | >1000 | ANY |
| Purpose of trip | Personal | Personal | Business | ANY |
| Occupation | ANY | ANY | C-level, Professional, Senior Manager | Student |
| Vehicle transmission | Manual | Manual | Automatic | ANY |
| Vehicle type | Low | Medium | High | ANY |
| Baby seat | Yes | ANY | No | ANY |
| Upgrade | ANY | ANY | Yes | ANY |
| Interests (based on places visited, user profile and linked social media accounts) | Beaches | ANY | Golf Courses | Concerts |
| Driver Safety Score | High | ANY | High | ANY |

As shown in Table 4, the four advertising campaigns are targeted at drivers based on the parameters 1-17, described below in detail. However, it will be appreciated by the person skilled in the art that the present embodiment of the invention is not limited to these parameters and alternative parameters may be used. Specifically, a number of parameters different from those outlined herein may be used or a subset/superset of the parameters described herein may be used.

(1) Current and Frequent Geofences

Figure 16:
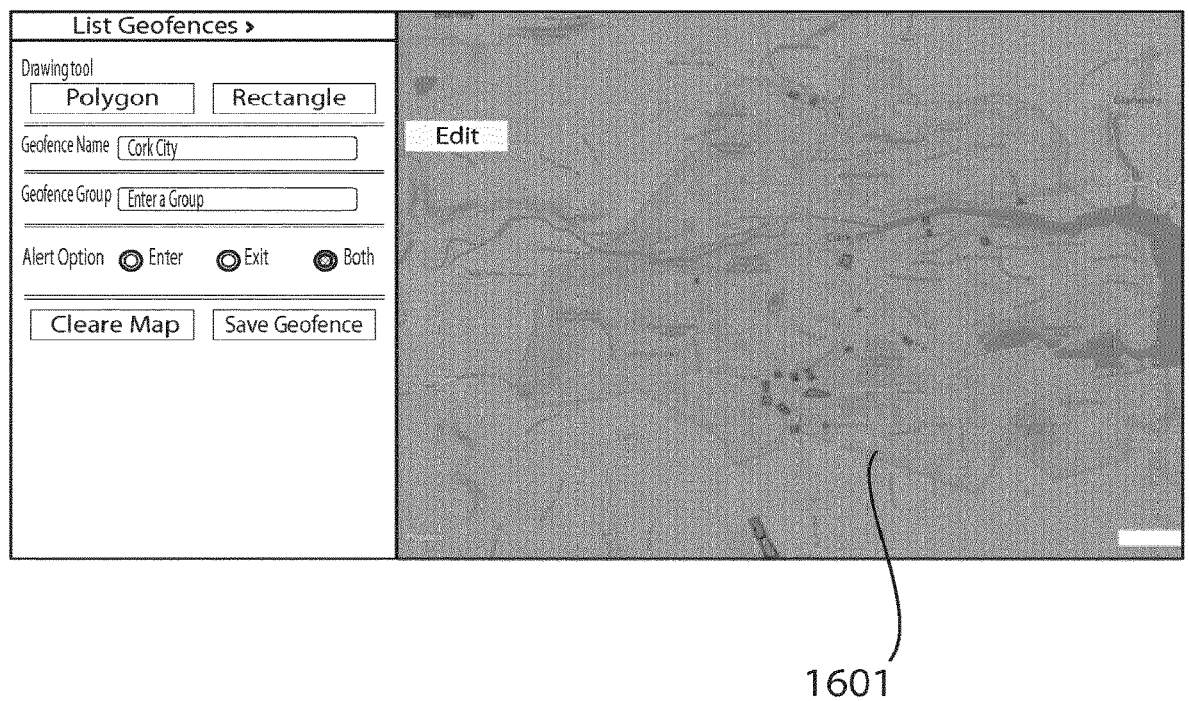
FIG. 16 is a graphical user interface showing a geofence in accordance with the present teachings.

The advertising platform 1505 allows users to select from a list of standard geofences or create their own geofences and target their advertisements at drivers/vehicle 1503 inside these locations. FIG. 16 shows a geofence 1601 created for "Cork City" which has been used as target location for the "Ad #1" campaign (Table 3).

Geofences can be used as a target location when the driver is currently in that location or if they have travelled frequently to this location in the past. This intelligence requires the combination of telematics and rental data. When a customer service representative opens a contract for a vehicle, the driver ID (e.g. driving license ID) and details are associated with that rental. The rental is then associated with journeys/position updates. The current position for each vehicle/driver is used to determine if the driver is currently inside the geofences created in the Advertising Platform (AP). The past journeys for each drivers are analyzed offline to determine the most frequently visited AP geofences. This output of this analysis is used to determine which drivers should be targeted for each advertising campaign.

(2) Age Range

The age of a driver is sent to the TSP 1501 as part of the rental data. This data is provided when the customer service representative opens a rental contract in the RLS. If the customer has rented with the company before then these details are saved and can be identified by driver-id. When a contract is opened the RLS sends to the TSP the rental data in real-time. The TSP 1501 subsequently correlates the data with telematics data received from the OBU of vehicle 1503 and sends it to the AP 1505.

(3) Sex

Again the sex of the driver is recorded when the contract is opened in the RLS 1502.

(4) Time of Day

Advertising campaigns can target their audience at certain times of the day.

(5) Home Location

Advertising campaigns can target audiences that have home addresses from specific locations. This data is entered to the RLS system when the contract is opened and sent to the TSP.

(6) Due Out and Back Locations

Advertising campaigns can target audiences that are known to be arriving back to specific locations. The due back location is entered when the rental contract is opened. The benefit of this targeting parameter is that if you know a driver is due back to a certain location then you can target that driver for offers that are based in that location.

(7) Length of and Remaining hire

Advertising campaigns can target audiences that are known to have several days left on their trip. For example, some campaigns may advertise hotel deals that are a number of days which they do not want to target at drivers who are not on their trip long enough to avail of this offer.

(8) Total miles travelled on this trip or all trips

Advertising campaigns can target audiences that are known to travel large distances or spend a long time in rental vehicles. This is calculated by the AP platform by adding the distance of all the journeys for every driver. This is useful for hotels to target drivers that are regularly on the road or regularly in rental vehicles as they know there is an opportunity for repeat business.

(9) Purpose of trip

Advertising campaigns can target audiences they know are in the country for business or for personal reasons. For example hotels can offer conference rooms/centers for drivers they know are here on business.

(10) Occupation

Advertising campaigns can target audiences based on their occupation. Every driver must provide their occupation when filling out the rental contract.

(11) Vehicle transmission

Advertising campaigns can target audiences based on the driver's preference of transmission (manual or automatic). Again when the rental contract is opened, the driver is associated with a specific vehicle for the duration of their rental. Past rentals will also be taken into account when deciding whether this driver has a significant preference for automatic vehicles. Vehicle manufacturers could use this information to target a campaign for a deal on automatic vehicles for drivers they know prefer automatic vehicles.

(12) Vehicle type

Advertising campaigns can target audiences based on the class of vehicle a driver typically rents. This information can indicate the type of products or driver is likely to buy (e.g. bargains or high end products). Vehicles that are spacious or have a larger number of seats can also indicate that the driver has a number of passengers and be travelling with his/her family.

(13) Baby seat

Advertising campaigns can target audiences based on whether the driver has purchased a baby seat. This indicates that the driver has a child on—board so advertisers wishing to promote products for children or families can target mothers or fathers by selecting this parameter.

(14) Additional

Advertising campaigns can target audiences based on whether there are two drivers. This makes is more likely that a couple are travelling together so advertisers could target romantic dinners or retreats.

(15) Upgraded

Advertising campaigns can target audiences based on whether the driver has upgraded their vehicle. This makes is more likely that the driver will avail of offers.

(16) Interests (based on places visited, user profile and linked social media accounts)

Advertising campaigns can target audiences based on their likely interests. This can be determined through several means. Firstly it can be based on the driver's past journeys and which locations they have visited (e.g. golf courses, cinemas, restaurants etc.). The rental company could provide the user with an app that can also be used to get more details about the user. This app can provide the user with value by allowing them to view and manage their vehicle trips. They can use this app automatically store data on their trip including each journey they took, places they visited and distance they travelled. Users can create journey log entries for each destination at each point on their vacation and share with friends and family. In addition, they can add preferences for offers they would like to receive. Other approaches could include providing infotainment in the vehicle through the OBU and monitor users' preferences in terms of purchased services (e.g. Spotify and Netflix).

(17) Driver Safety Score

Advertising campaigns can target audiences based on how safely they drive. This is determined by calculating the safety score for each driver based on all their past journeys. This takes the following into consideration:—

Contextual speed
  How fast they drive relative to other drivers on the same road Smooth driving
  How smoothly they use the break and accelerate. This shows how well drivers can anticipate changes in their surroundings Time of day
  Certain times of day have been proven to be more dangerous than others for driving Length of journeys
  Longer journeys have been proven to be more dangerous than shorter ones For example, hotels may want to avoid advertising to drivers considered to drive to fast as it may indicate poor care for the property of others.

It will be appreciated that if a driver meets the criteria outlined above for one of the four advertising campaigns, they are provided with the corresponding advertisement. Specifically, the advertising platform 1505 provides advertisements to the OBU unit 1503 and/or a mobile phone of the driver. The driver's mobile phone number and email are provided to the RLS 1502 when a contract is opened for a vehicle.

It should also be appreciated that the advertisements may take any suitable form known in the art e.g., a video to be displayed by the OBU, a text message to the mobile device of the driver.

Further to above, the advertising platform 1505 in accordance with the present teachings is concerned with (i) discovering characteristics and interests of drivers and (ii) advertisement ranking. There are two determining factors that are combined to determine which drivers see which advertisements (number of ad impressions). The first is whether their characteristics, interests and location match those of the advertising campaign. For example, a driver will match the "Full Irish Breakfast Offer—Gerry's Coffee Shop" campaign if they are currently on "Gerry's Coffee Shop Street", if they are male between the ages of 50 and 70, if is currently the morning, they are from the UK or Ireland, they rented their car from Dublin Airport and are returning to Dublin Airport, they are on a personal trip and if they are driving a manual medium sized vehicle. This is a highly targeted advertisement that is just for demonstration purposes. Most campaigns would not be as specific with their requirements.

The second is the advert rank which is only employed if there is more than one advertising campaign targeting the same set of drivers. The advert rank is influenced by the following parameters:

Max bid price
  Decided by the person setting up the campaign e.g., AP user 1506. This is the maximum amount of money that someone is willing to pay to have the advertisement provided to a driver. The higher the Max bid price, the higher the ranking.

Average number of people targeted
  This is number of drivers on average that an advertisement targets. Choosing a more targeted selection criteria and smaller geofences or geofences in less popular areas will make an advertisement more targeted and will increase the rank.

Click through rate of advertisement
  This is how often drivers when presented with your advertisement click through i.e., Click-through rate (CTR) is the ratio of users who click on a specific link to the number of total users who view a page, email, or advertisement Number of vehicles that have visited the offer location
If the offer location is a popular location, the advertisement will be ranked higher.

Each input parameter above is normalized and a weight is applied (w1–w4) to determine its influence in the overall rank.

Ad Rank=max bid price*w1+average number of people targeted*w2+average impression/click through rate of ad*w4+popularity of location of offer. It will be appreciated that these are merely exemplary parameters/weights for the purpose of explaining the subject embodiment of the invention.

Ad Rank=max bid price*w1+average number of people targeted*w2+average impression/click through rate of ad*w4+popularity of location of offer. It will be appreciated that these are merely exemplary parameters/weights for the purpose of explaining the subject embodiment of the invention.

The weighting parameters are tuned dynamically to regulate the extent of influence that each parameter should have on the overall rank. These weights are tuned dynamically by using machine learning on a real dataset. The algorithm would analyze the relationship that each of the above parameters has on the success of real advertising campaigns. For example, multiple linear regression can be employed to learn this relationship. Linear regression is a linear model, e.g. a model that assumes a linear relationship between the input variables (x1—max bid price, x2—average number of people targeted, x3-average click through rate of ad and x–4 popularity of location) and the single output variable (y—successful ad price). More specifically, that y can be calculated from a linear combination of the input variables (x1–x4).

When there is a single input variable (x), the method is referred to as simple linear regression. When there are multiple input variables, literature from statistics often refers to the method as multiple linear regression.

Accordingly, this embodiment of the invention in accordance with the present teachings provides a method for combining rental and telematics data to determine the characteristics and interests of drivers. It further leverages this data to provide an advertising platform that can offer more targeted advertising campaigns.

It will be appreciated by those skilled in the art that the teachings in accordance with the present invention provide a number of benefits including the following:—

Cut operational costs
  Complete fleet visibility
  Eliminate fraudulent claims
  Automated operational tasks
    Automate stock taking
    Automate check in/check out
Intelligent reporting
  Vehicle location anomalies
  Valeting efficiency
  Vehicle maintenance reports
Make faster and better decisions
  Impact detection
  Theft detection
New products and services
  Customer driver safety portal
  Journey tracker/diary
  Locate where your car is parked
  Locate customer after breakdown The words comprises/comprising when used in this specification are to specify the presence of stated features, integers, steps or components but does not preclude the presence or addition of one or more other features, integers, steps, components or groups thereof.

The invention claimed is:

1. A method of automatically checking-in a vehicle upon its return to a station or depot, comprising:
receiving, by a processor in a computing device from a fleet management system, fleet management data that includes a buy-back amount of mileage and a return location for the vehicle;
tracking, by a telematics service provider using an on-board unit of the vehicle, mileage of the vehicle throughout a rental period;
receiving, by the processor, geolocation data collected by the on-board unit of the vehicle;
using, by the processor, the received fleet management data, data collected by the on-board unit of the vehicle, and the received geolocation data to determine whether the vehicle is at the return location, by detecting entry of the vehicle into a geofenced area defining the return location, and whether the vehicle was involved in an impact to the vehicle during a rental period; and
closing, by the processor, a contract associated with the vehicle automatically in response to:
determining that the vehicle has entered into the geofenced area defining the return location based on the received fleet management data and the received geolocation data;
determining a threshold value based on the received buy-back amount of mileage;
determining a total rental mileage for the vehicle based on data collected by the on-board unit of the vehicle;
determining whether the total rental mileage exceeds the determined threshold value; and
triggering an alert in response to determining that the total rental mileage exceeds the determined threshold value and determining that the vehicle was involved in an impact to the vehicle during the rental period.

2. The method of claim 1, wherein using the received fleet management data and the received geolocation data to determine whether the vehicle is at the return location further comprises using the received fleet management data to determine whether the vehicle has been assigned to a Previously Presented contract.

3. The method of claim 1, wherein using the received fleet management data and the received geolocation data to determine whether the vehicle is at the return location further comprises:
determining whether the vehicle has remained within the return location for more than a period of time, wherein triggering the alert is further in response to determining that the vehicle remained within the return location for more than the period of time.

4. The method of claim 3, wherein determining that the vehicle has remained within the return location for more than the period of time comprises determining that the vehicle has remained within the return location overnight.

5. The method of claim 1, wherein closing the contract associated with the vehicle in response to determining that the vehicle is at the return location further comprises:
determining a return time that the vehicle entered the return location based on data collected by the on-board unit of the vehicle;
determining whether the return location is within an expected return location for the vehicle;
determining whether the determined return time is before an expected return time for the vehicle; and incrementing a total rental fee value associated with the vehicle in response to determining that the total rental mileage is not within the expected rental mileage for the vehicle, that the return location is not within the expected return location for the vehicle, or that the determined return time is not before the expected return time for the vehicle.

6. The method of claim 1, wherein closing the contract associated with the vehicle in response to determining that the vehicle is at the return location further comprises:
generating a prompt that indicates to a customer service representative to perform a manual inspection of the vehicle in response to determining that the vehicle was involved in an impact.

7. The method of claim 6, wherein:
the received fleet management data includes a rental period;
the data collected by the on-board unit of the vehicle includes force data identifying forces on the vehicle; and
determining whether the vehicle was involved in an impact based on the combination of the received fleet management data and data collected by the on-board unit of the vehicle comprises determining whether the forces on the vehicle exceeded a threshold value during the rental period.

8. The method of claim 1, wherein:
the received fleet management data includes information indicating whether the fuel in the vehicle was prepaid;
the data collected by the on-board unit of the vehicle includes fuel data identifying a current fuel level of vehicle; and
closing the contract associated with the vehicle in response to determining that the vehicle is at the return location further comprises incrementing a total rental fee value associated with the vehicle in response to determining that the fuel in the vehicle was not prepaid and that the current fuel level of vehicle is below a threshold value.

9. The method of claim 1, wherein:
the received fleet management data includes information vehicle manufacture data;
the data collected by the on-board unit of the vehicle includes information identifying a current fuel level of vehicle and a time period since a fuel station visit; and
closing the contract associated with the vehicle in response to determining that the vehicle is at the return location further comprises:
determining an expected fuel consumption value for the vehicle based on the vehicle manufacture data; and
determining a driving behavior of a driver of the vehicle based on the time period since the fuel station visit, the current fuel level of vehicle, and the expected fuel consumption value.

10. The method of claim 1, wherein the return location is defined by a geofence that surrounds a vehicle rental outlet.

11. A non-transitory computer readable storage medium having stored thereon processor-executable software instructions configured to cause a processor in a computing device to perform operations for automatically checking-in a vehicle upon its return to a station or depot, the operations comprising:
receiving from a fleet management system fleet management data that includes a buy-back amount of mileage and a return location for the vehicle;
tracking, by a telematics service provider using an on-board unit of the vehicle, mileage of the vehicle throughout a rental period;
receiving geolocation data collected by the on-board unit of the vehicle;
using the received fleet management data, data collected by the on-board unit of the vehicle, and the received geolocation data to determine whether the vehicle is at the return location, by detecting entry of the vehicle into a geofenced area defining the return location, and whether the vehicle was involved in an impact to the vehicle during a rental period; and
closing a contract associated with the vehicle automatically in response to:
determining that the vehicle has entered into the geofenced area defining the return location based on the received fleet management data and the received geolocation data;
determining a threshold value based on the received buy-back amount of mileage;
determining a total rental mileage for the vehicle based on data collected by the on-board unit of the vehicle;
determining whether the total rental mileage exceeds the determined threshold value; and
triggering an alert in response to determining that the total rental mileage exceeds the determined threshold value and determining that the vehicle was involved in an impact to the vehicle during the rental period.

12. The non-transitory computer readable storage medium of claim 11, wherein the stored processor-executable instructions are configured to cause the processor to perform operations such that using the received fleet management data and the received geolocation data to determine whether the vehicle is at the return location further comprises using the received fleet management data to determine whether the vehicle has been assigned to a Previously Presented contract.

13. The non-transitory computer readable storage medium of claim 11, wherein the stored processor-executable instructions are configured to cause the processor to perform operations such that using the received fleet management data and the received geolocation data to determine whether the vehicle is at the return location by detecting entry of the vehicle into the geofenced area further comprises:
determining whether the vehicle has remained within the return location for more than a period of time, wherein triggering the alert is further in response to determining that the vehicle remained within the return location for more than the period of time.

14. The non-transitory computer readable storage medium of claim 11, wherein the stored processor-executable instructions are configured to cause the processor to perform operations such that closing the contract associated with the vehicle automatically in response to determining that the vehicle has entered into the geofenced area defining the return location further comprises:
determining a return time that the vehicle entered the return location based on data collected by the on-board unit of the vehicle;
determining whether the return location is within an expected return location for the vehicle;
determining whether the determined return time is before an expected return time for the vehicle; and
incrementing a total rental fee value associated with the vehicle in response to determining that the total rental mileage is not within the expected rental mileage for the vehicle, that the return location is not within the expected return location for the vehicle, or that the determined return time is not before the expected return time for the vehicle.

15. The non-transitory computer readable storage medium of claim 11, wherein:
the received fleet management data includes a rental period;
the data collected by the on-board unit of the vehicle includes force data identifying forces on the vehicle; and
the stored processor-executable instructions are configured to cause the processor to perform operations such that closing the contract associated with the vehicle automatically in response to determining that the vehicle has entered into the geofenced area defining the return location further comprises:
determining whether the forces on the vehicle exceeded a threshold value during the rental period;
determining that the vehicle was involved in an impact based on whether the forces on the vehicle exceeded a threshold value during the rental period; and
generating a prompt that indicates to a customer service representative to perform a manual inspection of the vehicle in response to determining that the vehicle was involved in an impact.

16. The non-transitory computer readable storage medium of claim 11, wherein:
the received fleet management data includes information indicating whether the fuel in the vehicle was prepaid;
the data collected by the on-board unit of the vehicle includes fuel data identifying a current fuel level of vehicle; and
the stored processor-executable instructions are configured to cause the processor to perform operations such that closing the contract associated with the vehicle automatically in response to determining that the vehicle has entered into the geofenced area defining the return location further comprises incrementing a total rental fee value associated with the vehicle in response to determining that the fuel in the vehicle was not prepaid and that the current fuel level of vehicle is below a threshold value.

17. The non-transitory computer readable storage medium of claim 11, wherein:
the received fleet management data includes information vehicle manufacture data;
the data collected by the on-board unit of the vehicle includes information identifying a current fuel level of vehicle and a time period since a fuel station visit; and
the stored processor-executable instructions are configured to cause the processor to perform operations such that closing the contract associated with the vehicle automatically in response to determining that the vehicle has entered into the geofenced area defining the return location further comprises:
determining an expected fuel consumption value for the vehicle based on the vehicle manufacture data; and
determining a driving behavior of a driver of the vehicle based on the time period since the fuel station visit, the current fuel level of vehicle, and the expected fuel consumption value.

18. The non-transitory computer readable storage medium of claim 11, wherein the return location is defined by the geofenced area that surrounds a vehicle rental outlet.

* * * * *